US010570872B2

(12) United States Patent
Miller et al.

(10) Patent No.: US 10,570,872 B2
(45) Date of Patent: Feb. 25, 2020

(54) SYSTEM AND METHOD FOR A RANGE EXTENDER ENGINE OF A HYBRID ELECTRIC VEHICLE

(71) Applicant: Ford Global Technologies, LLC, Dearborn, MI (US)

(72) Inventors: Kenneth Miller, Canton, MI (US); Ross Dykstra Pursifull, Dearborn, MI (US); Thomas Leone, Ypsilanti, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 15/895,853

(22) Filed: Feb. 13, 2018

(65) Prior Publication Data
US 2019/0249639 A1    Aug. 15, 2019

(51) Int. Cl.
| | |
|---|---|
| *B60H 1/03* | (2006.01) |
| *F02N 19/02* | (2010.01) |
| *B60W 30/194* | (2012.01) |
| *B60H 1/18* | (2006.01) |
| *B60L 50/61* | (2019.01) |
| *B60L 58/12* | (2019.01) |
| *B60H 1/14* | (2006.01) |
| *B60H 1/08* | (2006.01) |
| *B60H 1/00* | (2006.01) |

(52) U.S. Cl.
CPC ............. *F02N 19/02* (2013.01); *B60H 1/004* (2013.01); *B60H 1/08* (2013.01); *B60H 1/143* (2013.01); *B60H 1/18* (2013.01); *B60L 50/61* (2019.02); *B60L 58/12* (2019.02); *B60W 30/194* (2013.01); *B60L 2240/445* (2013.01); *B60L 2260/44* (2013.01); *B60L 2260/52* (2013.01); *B60L 2260/54* (2013.01); *B60W 2510/244* (2013.01)

(58) Field of Classification Search
CPC ... Y02T 10/6217; Y02T 10/642; Y02T 90/16; B60W 10/08; B60W 20/00; B60L 2240/36; B60H 1/004; B60H 1/143; F02N 19/10; F02N 19/04
USPC .................................................. 123/142.5 R
See application file for complete search history.

(56) References Cited

U.S. PATENT DOCUMENTS

| | | |
|---|---|---|
| 4,548,186 A | 10/1985 | Yamaji et al. |
| 5,280,158 A | 1/1994 | Matava et al. |

(Continued)

FOREIGN PATENT DOCUMENTS

| | | |
|---|---|---|
| CA | 2703854 A1 | 5/2009 |
| CN | 203163569 U | 8/2013 |

(Continued)

*Primary Examiner* — Long T Tran
*Assistant Examiner* — James J Kim
(74) *Attorney, Agent, or Firm* — Geoffrey Brumbaugh; McCoy Russell LLP

(57) ABSTRACT

Methods and systems are provided for improving the operating range of an electric vehicle having an engine wherein waste heat generated during motor operation is transferred to pre-heat the engine. Engine starting is predicted based on the electrical torque demand of the vehicle relative to the actual and predicted electrical energy consumption of the electric vehicle. Prior to starting the engine to charge a battery of the motor, various engine components are pre-heated in an order that improves vehicle range while also optimizing fuel economy.

17 Claims, 7 Drawing Sheets

(56) References Cited

U.S. PATENT DOCUMENTS

| | | |
|---|---|---|
| 5,307,780 A | 5/1994 | Dodge |
| 5,398,747 A | 3/1995 | Miaoulis |
| 5,647,534 A | 7/1997 | Kelz et al. |
| 6,138,466 A | 10/2000 | Lake et al. |
| 6,183,886 B1 | 2/2001 | Chen et al. |
| 6,232,577 B1 | 5/2001 | Reiff |
| 6,917,019 B2 | 7/2005 | Richter |
| 7,077,224 B2 | 7/2006 | Tomatsuri et al. |
| 8,203,274 B2 | 6/2012 | De Castro |
| 8,424,287 B2 | 4/2013 | Atluri et al. |
| 8,707,934 B2 | 4/2014 | Rowley et al. |
| 8,851,153 B2 | 10/2014 | Park et al. |
| 9,238,460 B1* | 1/2016 | Jiang ................... B60W 20/15 |
| 9,561,704 B2* | 2/2017 | Enomoto ........... B60H 1/00485 |
| 2003/0230443 A1* | 12/2003 | Cramer ................... B60G 3/20 180/65.51 |
| 2009/0071428 A1* | 3/2009 | Kamiyama ........ B60H 1/00314 123/142.5 R |
| 2009/0180250 A1 | 7/2009 | Holling et al. |
| 2010/0170455 A1* | 7/2010 | Feldhaus ................. F01P 3/20 123/41.08 |
| 2011/0155489 A1 | 6/2011 | Wenger et al. |
| 2012/0191282 A1* | 7/2012 | Maki ...................... B60K 6/442 701/22 |
| 2013/0261914 A1* | 10/2013 | Ingram ................. B64C 39/024 701/70 |
| 2015/0097415 A1* | 4/2015 | Shimada .................. B60T 7/042 303/3 |
| 2015/0114323 A1* | 4/2015 | Paetkau ................... F01P 3/20 123/2 |
| 2015/0298555 A1* | 10/2015 | Bennett ................ B60L 11/123 701/22 |
| 2015/0369619 A1* | 12/2015 | Kim ................... G01C 21/3469 701/22 |
| 2016/0032880 A1* | 2/2016 | Lovett ................ F02N 11/0803 701/22 |

FOREIGN PATENT DOCUMENTS

| | | |
|---|---|---|
| CN | 103780158 A | 5/2014 |
| WO | 9212334 A1 | 7/1992 |
| WO | 2013153067 A1 | 10/2013 |
| WO | 2015170447 A1 | 11/2015 |

* cited by examiner

SYSTEM AND METHOD FOR A RANGE EXTENDER ENGINE OF A HYBRID ELECTRIC VEHICLE

FIELD

The present description relates generally to methods and systems for controlling the preheating and starting of a range extender engine of a hybrid electric vehicle.

BACKGROUND/SUMMARY

A range extender in a hybrid electric vehicle consists of a small internal combustion engine which drives an alternator to produce electrical energy. This electrical energy supplements the electrical energy stored in a battery or other electric energy storage device, which is used primarily to power the electric motor which propels the vehicle. Range extenders are used to extend the limited range of purely electric vehicles. Because current battery technology cannot provide the required electrical energy to give a pure electric vehicle sufficient range, an electric vehicle having a range extender offers a compromise between an internal combustion powered vehicle and a pure electric vehicle. An EV with a range extender is different than a HEV because the range extender engine is an auxiliary system, primarily used if the battery SOC is too low to complete the trip. This compromise improves vehicle performance and extends the vehicle's range while keeping emissions minimal.

The range extender engine may be selectively started if the state of the charge (SOC) of the battery is lower than required to meet driver torque demand, or if the battery SOC is not sufficient for the vehicle to reach a desired destination. If the range extender engine is started at ambient temperatures that are lower than the optimum operating temperature for engine and emissions components, such as fuel injectors, combustion chambers, oxygen sensors, catalytic converters, etc., engine performance may be degraded. For example, the range extender engine may display lower than optimum fuel efficiency, or increased engine wear, when starting due to the need to idle and warm up before the driver demanded torque can be delivered.

One way to increase fuel efficiency and reduce emissions is to preheat the range extender engine and/or other temperature sensitive engine components prior to engine start. Various types of preheaters may be employed for this task, such as coolant-based heaters, electric resistive heaters, heat pumps, heat pipes, etc. However, a common challenge encountered by each of these heating systems is determining when to initiate the preheating. If preheating is initiated too late, insufficient preheating will occur, resulting in decreased engine efficiency and increased tailpipe emissions at start-up. Alternatively, if preheating is initiated too early, greater than necessary amounts of energy will be expended by the preheating system to maintain the preheat temperature for an extended period of time. This is energetically inefficient, potentially costly, and may result in overheating of vehicle components.

Various approaches have been developed to accurately determine the required duration of vehicle component preheating to avoid issues associated with initiating preheating too early, or too late, as discussed above. One such approach, described by Matava et al. in U.S. Pat. No. 5,280,158, teaches a method for controlling the initiation and duration of preheating of vehicle engine/components. The method determines the required duration of preheater operation and initiates the preheating based on a manually selected time of next vehicle use, such that preheating is concluded at, or near, the time when the vehicle will next be started. The preheating is achieved via one or more electric resistive heaters, such as an engine block contact heater, a coolant heater, an engine oil heater, and a battery heater.

The inventors herein have recognized potential issues with the above approach. As one example, the method assumes that the temperature of the engine, or other vehicle components to be preheated, is initially at ambient temperature. However, based on the duration of operation of the motor, battery, inverter, and other electric components of the electric vehicle, the temperature of the range extender engine and other components may deviate from the ambient temperature (for example, they may be higher than the ambient temperature). The temperature may also be affected by the frequency of operation of the range extender engine on a given drive cycle. As another example, the method of Matava assumes that heat is transferred to vehicle components by the preheater at a constant rate or by a fixed amount. The heat transfer is not measured, but is inferred based on data provided by the manufacturer of said preheater. However, there may be preheaters which are unable to provide a constant output of heat. For example, in a coolant based system, the amount of heat that can be transferred to the engine by the coolant may depend on how many heat sources the coolant is coupled to, and how hot each heat source is. Even with heaters that provide a relatively constant heat output, such as electric resistive heaters, the heat output may change as the heater ages, if the heater degrades, or based on the power source coupled to the heater. If the preheating time is not correctly accounted for, there may be insufficient heating which can degrade the engine's performance, or there may be overheating which can degrade fuel economy and affect component life. As yet another example, the method of Matava requires the user to manually input a vehicle operation schedule so that the preheating time can be accordingly adjusted. However, there may be situations where the operator is unable to provide the input manually, such as when there is an unplanned change in vehicle destination, unexpected traffic delays, etc. Requiring frequent operator input to preheat the engine may also degrade the operator's drive experience.

In one example, the above issues may be addressed by a method for an electric vehicle comprising: transferring, via a heat exchange mechanism, waste heat from a vehicle drive motor and associated power electronics to pre-heat an internal combustion engine. In this way, an engine preheating may be more accurately coordinated with engine operation.

As an example, a vehicle may be configured with an electric motor for propelling vehicle wheels. The vehicle may further include a range extender engine that is intermittently operated when the state of charge of a battery driving the motor falls below a threshold. The engine is operated to charge the battery, or directly provide electrical energy to the motor, while the motor continues to propel the vehicle. Based on vehicle operating conditions such as a duration/distance of vehicle operation remaining until a destination is reached, an expected average power consumption along a planned route, a current battery state of charge (SOC) and an expected rate of drop in battery SOC, as well as driver aggressiveness, a vehicle controller may predict when the engine may be started. Based on ambient conditions, such as ambient temperature, wind charging, precipitation, etc., as well as a duration elapsed since a last time the engine was operated, the controller may infer an amount of preheating required for the engine, before the engine start. The controller may also calculate an amount of waste heat available on board the vehicle, such as based on measured or inferred temperature of one or more of the plurality of waste heat sources, as well as based on the amount of heat generated at one or more vehicle locations based upon vehicle operating conditions. The controller may schedule heat transfer from the waste heat sources to the engine upon comparing the amount of heat required for preheating the engine with the amount of waste heat available. For example, the scheduling may include transferring waste heat from an electric motor to a catalytic converter, based upon a measured or inferred temperature of the electric motor being greater than a threshold, and further based upon the temperature of the catalytic converter being below a threshold. In another example, the scheduling may including initiating said preheating such that the preheating is completed at or before the predicted engine start time. In another example, the scheduling may include ending preheating based upon an indication that the one or more range extender engine components being preheated has reached or surpassed a threshold temperature. Heat may be transferred via a heat exchange system including a plurality of heat exchangers thermally connected via a common fluid, such as coolant, which flows throughout the system, thereby transferring waste heat to one or more components of the range extender engine. Selection of which waste heat sources are utilized for preheating, which waste heat source is utilized to preheat which range extender engine component, and the extent/rate to which heat is transferred from said waste heat sources, may be based upon the temperatures of the waste heat sources, their spatial position relative to the range extender engine components, and the amount of preheating required by the range extender engine components. In one example, waste heat from an inverter may utilized to preheat one or more combustion chambers of a range extender engine based on the temperature of the inverter being greater than the temperature of the one or more combustion chambers, and further based on the inverter being located near the range extender engine. In another example, the rate of heat transfer out of the inverter, and into the combustion chambers, may be increased based upon an indication that the combustion chambers require a greater than a threshold amount of preheating.

In this way, by evaluating both the available waste heat, and the heat required for range extender engine preheating, a duration of preheating can be estimated. This estimated duration of preheating, in conjunction with a predicted engine start time, enables a controller of the vehicle to initiate preheating such that preheating is completed before or at the predicted engine start. As a result, under-heating or overheating of the engine is avoided. The technical effect of initiating heat transfer from waste heat sources in a vehicle propelled via electric motor, to a range extender engine, based on a predicted range extender engine start, is that preheating is completed within a threshold time of the predicted start. In this way, a more accurate and reliable preheating schedule can be provided, reducing the losses associated with over heating or under heating the engine. By preheating the engine, engine performance is improved, and the range of the electric vehicle is extended.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for preheating a range extender engine using waste heat based on a predicted engine start time and an estimated duration of preheating. The method may be applied to hybrid vehicle propulsion systems, such as the hybrid electric vehicle system employing a range extender engine shown in FIG. 1. Specifically, the description relates to preheating the range extender engine and/or its associated components by transferring heat to those components from waste heat sources via a heat exchange system, such as the heat exchange system shown in FIG. 2. An engine controller may be configured to perform a routine, such as the example routine of FIG. 3, to preheat a range extender engine and its associated components using waste heat based on a predicted engine start time and an estimated preheating duration, such that preheating is completed within a threshold time before the predicted engine start. Engine start time may be predicted by a method such as that shown in FIG. 4, while the duration of preheating may be estimated by a method such as that shown in FIG. 5. The preheating may be conducted according to the method shown in FIG. 6, which evaluates which sources of waste heat are to be utilized, and which engine system components require heating. The heat exchange system shown in FIG. 2 may include heat exchangers associated with one or more waste heat sources, heat exchangers associated with one or more engine system components, and may also include a heat exchanger in contact with a phase change material (PCM). Operation of the heat exchange system of FIG. 2 may be controlled according to a method, such as the example method shown in FIG. 7, to store heat in this PCM when waste heat is in excess, or to utilize stored waste heat to preheat the engine/components.

Figure 1:
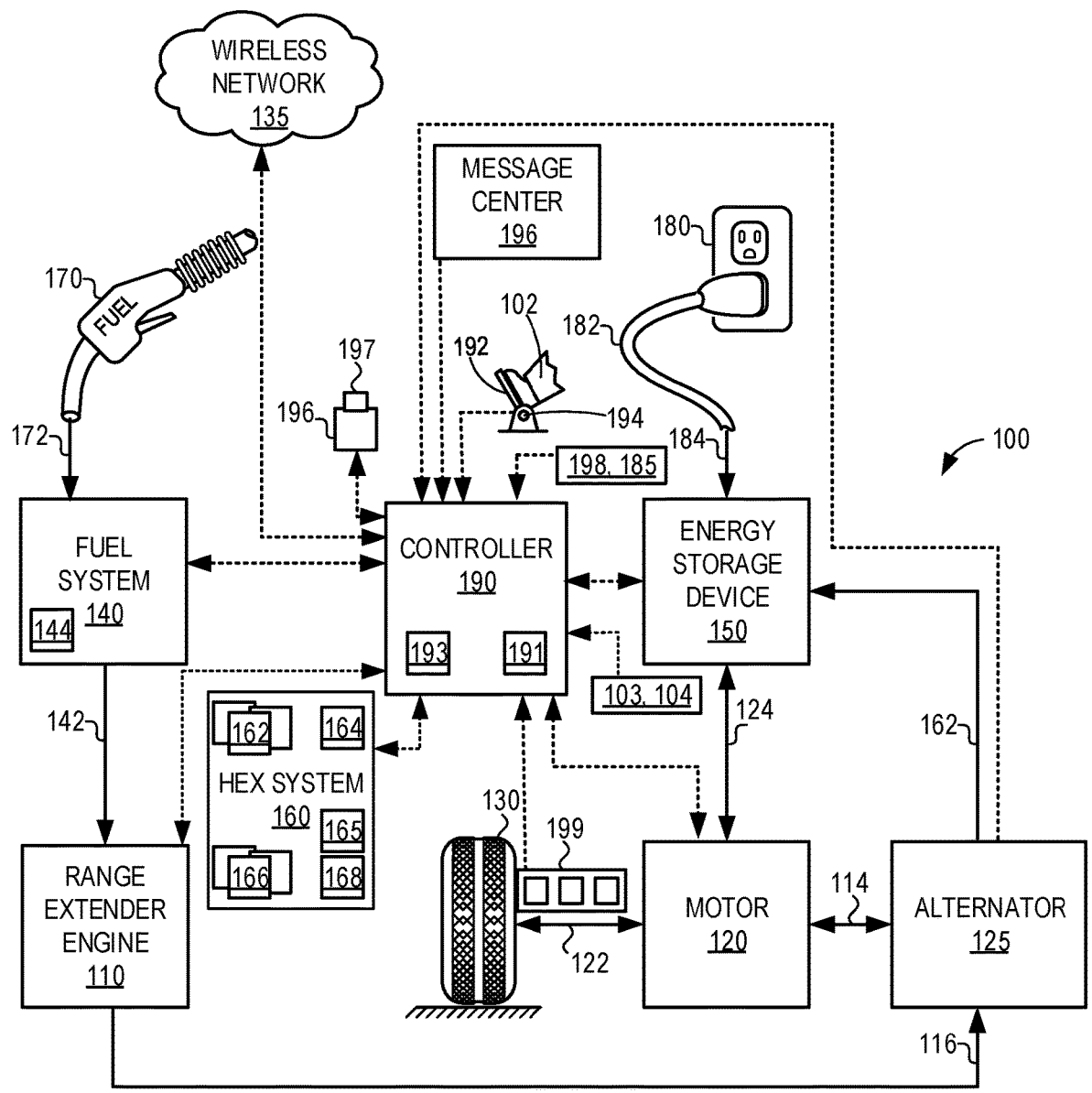
FIG. 1 shows an example vehicle propulsion system of an electric vehicle with a range extender engine.

FIG. 1 illustrates an example vehicle propulsion system 100. Vehicle propulsion system 100 includes a motor 120 and a fuel burning engine 110, herein after the engine 110 is also referred to as the range extender engine 110. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. A vehicle with propulsion system 100, which includes a motor for propulsion, and a range extender engine for supplemental energy generation, may be referred to as a series hybrid electric vehicle (SHEV) or an extended-range electric vehicle (EREV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated (herein also referred to as an electric-only mode). During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, alternator 125 may instead receive wheel torque from drive wheel 130, where the alternator may convert the kinetic energy of the vehicle to electrical energy for storage at energy storage device 150 as indicated by arrow 162.

Vehicle propulsion system 100 is configured as a series type hybrid electric vehicle propulsion system, whereby the engine is not directly coupled to a drive wheel of the vehicle and does not directly provide torque for vehicle propulsion. Rather, engine 110 may be operated to provide supplemental power to motor 120, which may in turn propel the vehicle via drive wheel 130 as indicated by arrow 122. For example, during select operating conditions, engine 110 may drive alternator 125 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide an alternator function to convert the engine output to electrical energy, where the electrical energy may be stored at energy storage device 150 for later use by the motor. As the range extender engine may be operated to provide supplemental power for vehicle propulsion, in some control schemes the range extender may be operated intermittently during a single drive cycle. As the range extender engine may generally be smaller than a conventional internal combustion engine, thereby having a smaller thermal mass, the temperature of one or more range extender engine components may decrease substantially between one operation cycle and the next, thus incurring a reduction in performance of said component. The current disclosure teaches systems and methods to mitigate the performance penalty incurred by one or more components of a range extender engine upon cold starting, by preheating one or more range extender engine components using waste heat, a timing of the preheating determined based on a predicted engine start, such that preheating is completed at or before the predicted start.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to range extender engine 110, where they may be combusted at the engine to produce an engine output. The engine output may be utilized to generate electricity by operating alternator 125, said electricity used to directly power motor 120, or to recharge energy storage device 150.

In some embodiments, energy storage device 150 may be configured to store electrical energy that may be supplied to other electrical loads residing on-board the vehicle (other than the motor), including a cabin heating and air conditioning system, engine starting system, headlights, cabin audio and video systems, etc. As a non-limiting example, energy storage device 150 may include one or more batteries and/or capacitors.

Control system 190 may communicate with one or more of range extender engine 110, motor 120, fuel system 140, energy storage device 150, and alternator 125. Control system 190 may receive sensory feedback information from one or more of engine 110, motor 120, fuel system 140, energy storage device 150, and alternator 125. Further, control system 190 may send control signals to one or more of range extender engine 110, motor 120, fuel system 140, energy storage device 150, and alternator 125 responsive to this sensory feedback. Control system 190 may receive an indication of an operator requested output of the vehicle propulsion system from a vehicle operator 102. For example, control system 190 may receive sensory feedback from pedal position (PP) sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle, whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected from the power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

The vehicle propulsion system 100 may also include ambient temperature sensor 198, humidity sensor 185, and engine temperature sensor 115. In one example, engine temperature sensor 115 is an engine coolant temperature (ECT) sensor wherein the engine temperature is inferred from the engine coolant temperature. In another example, engine temperature sensor 115 is a cylinder head temperature (CHT) sensor wherein the engine temperature is inferred from the cylinder head temperature. Further, vehicle propulsion system 100 may include a heat exchange system 160 for temperature control of a range extender engine. Heat exchange system 160 may include various components, such as a plurality of heat exchangers 162 associated with both a plurality of range extender engine components and a plurality of waste heat sources, temperature sensors 166 for inferring the temperatures of one or more range extender engine components and waste heat sources, a pump 164, and a coolant sump 168. Operation of heat exchange system 160 may be controlled by controller 190 according to one or more methods stored in non-transitory memory of controller 190, such as those methods described in FIG. 5, FIG. 6, and FIG. 7. In one example, heat exchange system 160 may be operated by controller 190 to transfer waste heat from one or more of the plurality of waste heat sources, to one or more of the plurality of range extender engine components via operation of pump 164, to preheat the said range extender engine components prior to a predicted engine start time.

Figure 2:
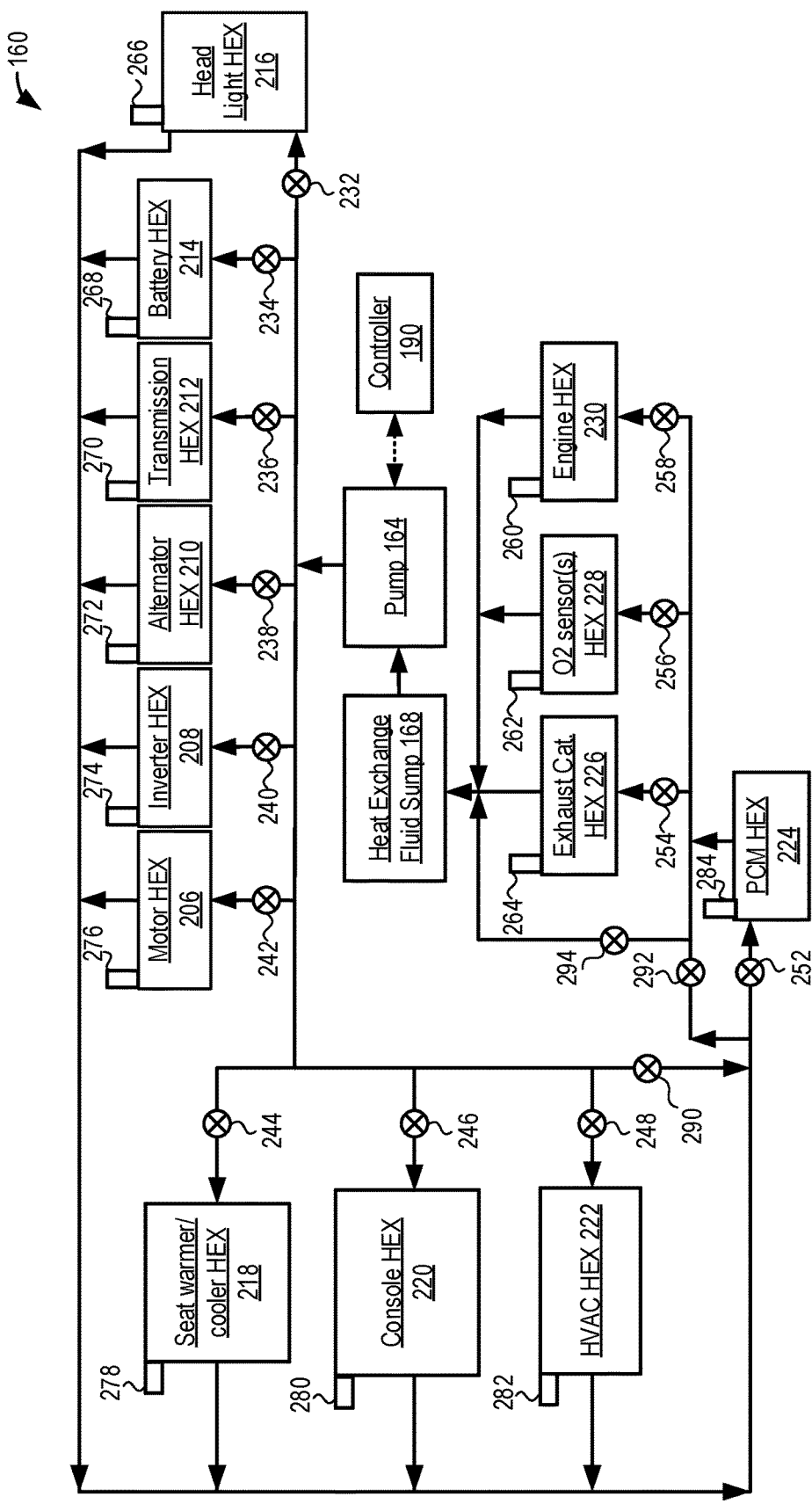
FIG. 2 shows an example vehicle heat exchange system.

Turning now to FIG. 2, an example embodiment of heat exchange system 160 is shown. Heat exchange system 160 represents one possible embodiment of a heat exchange system, however it will be appreciated that other embodiments are possible. Heat exchange system 160 consists of a network of heat exchangers, each associated with one or more components of a vehicle, and each heat exchanger connected to the network via passages, pipes, or ducts such that a common fluid may flow throughout the system, thereby enabling heat transfer between the plurality of waste heat sources and range extender engine components. The heat exchange fluid within heat exchange system 160 may be a liquid or a gas, or may transition from liquid to gas at the relatively warmer temperatures within the waste heat sources, and transition from gas to liquid at the relatively cooler temperatures within the components to be preheated. In the case that the heat exchange fluid is capable of changing phase within the temperature range likely to be found within said system, fluid flow through the system may be achieved through natural convection. However, in other embodiments, such as the embodiment represented by heat exchange system 160, the heat exchange fluid may remain in a single phase, and fluid flow within the heat exchange system may be generated by action of a pump, such as pump 164.

Heat exchange system 160 includes pump 164. Pump 164 may be a centrifugal pump or a positive displacement pump. In some embodiments, the heat exchange system may employ more than one pump, the additional pump(s) being backup pump(s), or pump(s) for flowing heat exchange fluid through only a part of the overall heat exchange system. In one example pump 164 may be an electric pump, such that pumping power is provided by an electric energy storage device, such as a battery, or capacitor. In another example, pump 164 may be driven by the vehicle motor via a belt and pulley system. In further examples, pump 164 may be provided motive power from a plurality of sources, with selection of which source, or which combination of sources provide power to pump 164 adjusted by a vehicle controller, such as controller 190, based upon vehicle operating conditions. Controller 190 may further command pump 164 to produce a specified output based upon vehicle operating conditions, ambient conditions, or one or more inferred or measured vehicle component temperatures. In one example, while the ambient temperature is below a threshold, controller 190 may command a higher output to pump 164 to provide greater flow through heat exchange system 160, thereby increasing the rate of heat transfer to vehicle components to be preheated. In another example, while the ambient temperature is above a threshold, vehicle controller 190 may command a lower output to pump 164 to provide a lesser flow through heat exchange system 160, thereby providing the requisite amount of heat transfer while consuming less energy. In another example, based on an indication that the waste heat sources are above a threshold temperature, controller 190 may command a lower output to pump 164, as a requisite amount of heat transfer can be provided at a lower flow rate, thus consuming less energy. In a converse example, based on an indication that the waste heat sources are below a threshold temperature, controller 190 may command a higher output to pump 164 in order to provide a requisite amount of heat transfer despite the lower waste heat source temperatures. Similarly, in another example, based upon an indication that the components to be preheated are below a threshold temperature, controller 190 may command a greater output to pump 164. In another example, based upon an indication that the components to be preheated are above a threshold temperature, controller 190 may command a lower output to pump 164. The above mentioned temperature thresholds may be chosen based on vehicle operating conditions, ambient conditions, or on the temperatures of one or more vehicle components or waste heat sources.

The pump draws heat exchange fluid from a reservoir, such as heat exchange fluid sump 168, before flowing it throughout the rest of the heat exchange system. The heat exchanger fluid sump 168 may be configured to enable periodic replacement of heat exchanger fluid with within the heat exchange system. In one example, heat exchange fluid, such as coolant, may need to be replaced every 6 months, to ensure degradation of the coolant does not reduce the efficiency of operation of the heat exchange system.

The heat exchange system 160 includes a plurality of heat exchangers 206-230. Each heat exchanger is in thermal contact with one or more vehicle components, such that flow of heat exchange fluid through the heat exchanger associated with a particular vehicle component facilitates heat transfer between the heat exchange fluid and said vehicle component. The plurality of heat exchangers comprising heat exchange system 160 are herein divided into two groups, those associated with waste heat sources, and those associated with components to be preheated. However, it will be appreciated that under some operating conditions a waste heat source may function as a component in need of preheating, and conversely, a component to be preheated may function as waste a heat source. The plurality of heat exchangers comprising heat exchange system 160 may include any type of heat exchanger conventionally known in the art, and as such, a more detailed discussion of the various types of heat exchangers which may be employed by the current method will be foregone.

In heat exchange system 160, heat exchange fluid first passes through a parallel array of heat exchangers (HEX) associated with waste heat sources, such as motor HEX 206, inverter HEX 208, alternator HEX 210, transmission HEX 212, battery HEX 214, headlight HEX 216, seat warmer/cooler HEX 218, console HEX 220, and HVAC HEX 222. As the heat exchange fluid passes through the heat exchangers associated with waste heat sources, its temperature increases as it absorbs thermal energy. The amount of heat transferred from the waste heat sources to the heat exchange fluid depends on the rate of flow, and the difference in temperature between the two, with higher flowrates and greater temperature differences corresponding to higher rates of heat transfer. Flow through each waste heat source associated heat exchanger is controlled by operation of pump 164 (as discussed above), as well as by a valve associated with each heat exchanger, such as valves 232-248. The valve may be located upstream of the heat exchanger for which it regulates flow, such actuating the valve may change the cross sectional area of flow through the region of the valve, thereby increasing or decreasing the downstream flow proportional to this area. The valve may be an on/off valve, or a continuously adjustable valve, such that flow through the associated heat exchanger may be continuously adjustable between a range bounded by a maximum and minimum value, where the maximum value is greater than zero, and the minimum value may be zero or may be greater than zero. In one example, a vehicle controller, such as controller 190, may actuate the valve controlling flow to a waste heat source heat exchanger to disable flow of heat exchange fluid through said HEX based upon an estimated temperature of the associated waste heat source being lower than a lower temperature threshold. The lower temperature threshold may be based upon the range extender engine temperature, or the temperatures of the other waste heat sources. In another example, a vehicle controller may actuate the valve controlling flow to a waste heat source heat exchanger to disable flow of heat exchange fluid through said HEX, based upon a measured or inferred temperature of the heat exchange fluid exceeding an upper threshold temperature. The upper threshold temperature may be chosen for one or more of the plurality of waste heat sources, and may be based on the performance of said waste heat source as a function of temperature, and may further be based on the material properties of the waste heat source, such that a performance penalty caused by "overheating" of one or more of the plurality of waste heat sources will be avoided by said disabling. Estimation of waste heat source temperatures may be based on vehicle operating conditions, such as duration of vehicle operation, the current route, motor output, ambient conditions such as temperature, weather, and humidity, or it may be inferred based on readings from one or more temperature sensors associated with, or in the proximity of, the relevant heat exchanger, such as temperature sensors 266-282 shown in FIG. 2.

In another example, controller 190 may actuate the valve associated with a waste heat source heat exchanger to increase the flow of heat exchange fluid through said heat exchanger based upon an estimated rate of waste heat generation, such that waste heat sources generating more heat in a given amount of time may have an increased flow through their associated heat exchanger. Under some conditions it may be beneficial to bypass all waste heat sources, such as when all waste heat sources are below a threshold temperature. In heat exchange system 160, all waste heat source associated heat exchangers may be bypassed by closing valves 232-248 and opening waste heat source bypass valve 290. Bypassing all waste heat source associated heat exchangers may occur when all heat sources are below a threshold temperature, and thus would behave as heat sinks.

After passing through the parallel array of heat exchangers associated with waste heat sources, the heat exchange fluid may then flow through a parallel array of heat exchangers associated with temperature sensitive range extender engine components, such as exhaust catalyst HEX 226, oxygen (O2) sensor HEX 228, combustion chamber HEX 230, and fuel rail/injector HEX 232. These range extender engine components display improved performance at temperature ranges significantly above ambient air temperatures, and thus may display reduced performance upon cold engine start. By preheating one or more of these range extender engine components, this reduced engine performance upon cold start may be at least partially mitigated. As discussed above, the rate of heat transfer between the heat exchange fluid and an engine component may depend on the flowrate of the heat exchange fluid through the heat exchanger associated with said engine component. As discussed above in regards to waste heat source associated HEXs, one or more valves may control flow through one or more heat exchangers associated with the range extender engine components. In another example, a vehicle controller may actuate the valve controlling flow to a range extender engine component heat exchanger to disable flow of heat exchange fluid through said HEX, based upon a measured or inferred temperature of the heat exchange fluid exceeding an upper threshold temperature. The upper threshold temperature may be chosen for one or more of the plurality of range extender engine components, and may be based on the performance of said range extender component as a function of temperature, and may further be based on the material properties of the range extender engine component, such that a performance penalty caused by "overheating" of one or more of the plurality of range extender engine components will be avoided by said disabling. In the embodiment shown by heat exchange system 160, each of the heat exchangers has a single valve located upstream of said heat exchanger, such as valves 254-259. Temperature sensors 260-264 are associated with the range extender engine components, and may relay temperature data to controller 190. Although the temperature sensitive range extender engine components are herein described as those components to be preheated, it will be appreciated that under some conditions these components may not require preheating, and may even function as heat sources. These components may display temperature sensitive performance, such that improved performance may be achieved within a finite range of temperatures. This range may generally be greater than ambient temperature and may depend on the specific component, or vehicle operating conditions and ambient conditions. Thus, when a range extender engine starts after a prolonged period of inactivity, sub-optimal performance may be displayed by one or more engine components. As an example, oxygen sensors, such as universal exhaust gas sensors (UEGO), are calibrated to accurately measure oxygen concentrations within a specific range of temperatures, with the accuracy of these sensors either decreasing or non-functional outside of this temperature range. By flowing heat exchange fluid first through waste heat source associated heat exchangers, and then by flowing this fluid through heat exchangers associated with ambient/below optimal temperature engine components, said engine components may be preheated prior a predicted engine start, thereby conferring a performance benefit both to the engine components, and to the engine as a whole. In one example, preheating the UEGO sensor via operation of a heat exchange system, such as heat exchange system 160, may enable more precise measurement of the oxygen content in the exhaust gas, this may in turn enable the vehicle controller to more accurately determine the appropriate amount of fuel to inject into the combustion chambers, thereby increasing fuel efficiency and reducing emissions.

Heat exchange system 160 may further include one or more heat exchangers for transferring heat between the heat exchange fluid and a phase change material (PCM). Said PCM may function as a heat reservoir for storing excess heat for later use, and for providing stored heat for preheating when insufficient heat is available at the plurality of waste heat sources. A PCM stores heat by undergoing a phase transition at a characteristic temperature, the enthalpy change associated with this phase change is large, and as such, PCMs are able to absorb and release large amounts of thermal energy as they change phase. As such, when excess waste heat is available, heat may be stored within the PCM for later use by flowing heat exchange fluid through the one or more sources of excess waste heat before flowing the warmed heat exchange fluid through the heat exchanger associated with the PCM, such as PCM HEX 224 of heat exchange system 160. In the example embodiment depicted by heat exchange system 160, excess waste heat may be stored in PCM HEX 224 by opening valve 252, which enables heat exchange fluid to flow through PCM HEX 224, and by closing PCM bypass valve 292, which disables heat exchange fluid from bypassing PCM HEX 224. In addition, flow through one or more, or all, of range extender engine component associated heat exchangers may be prevented by closing one or more, or all, of valve 254, valve 256, valve 258, or valve 259. In the case that valves 254-259 are all completely closed, range extender engine component bypass valve 294 may be opened to allow flow through heat exchange system 160 to continue uninterrupted. As the warmed heat exchange fluid flows through the PCM associated heat exchanger, the PCM may increase in temperature and partially or completely undergo a phase transition, thereby storing waste heat. Additionally, while insufficient or limited waste heat is available, the PCM may act as an alternate source of heat. In another example, while the plurality of waste heat sources are lower than a threshold temperature, or while the plurality of waste heat sources possess less than a threshold amount of useful heat, than valve 252 may be actuated to enable flow through PCM HEX 224. As heat exchange fluid flows through PCM HEX 224, the PCM may release heat as it transitions from one phase to another, such as when it transitions from a liquid to a solid, thereby increasing the temperature of the heat exchange fluid. The heat exchange fluid may then flow through one or more of the plurality of range extender engine component associated heat exchangers, to provide preheating.

Figure 6:
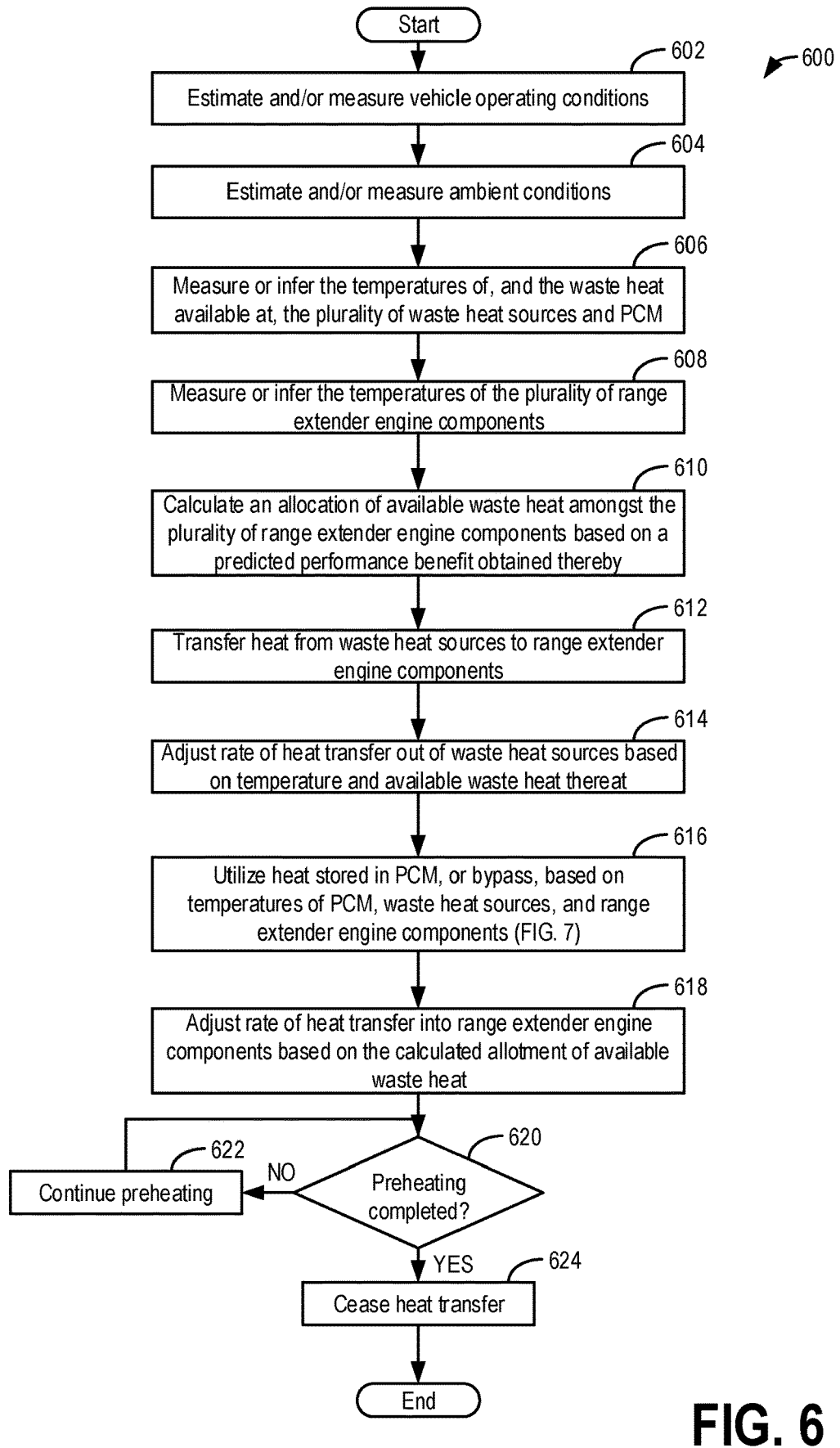
FIG. 6 shows a high level flowchart of an example method for operating a vehicle heat exchange system to transfer heat from waste heat sources, and/or heat reservoir, to range extender engine/components.
Figure 7:
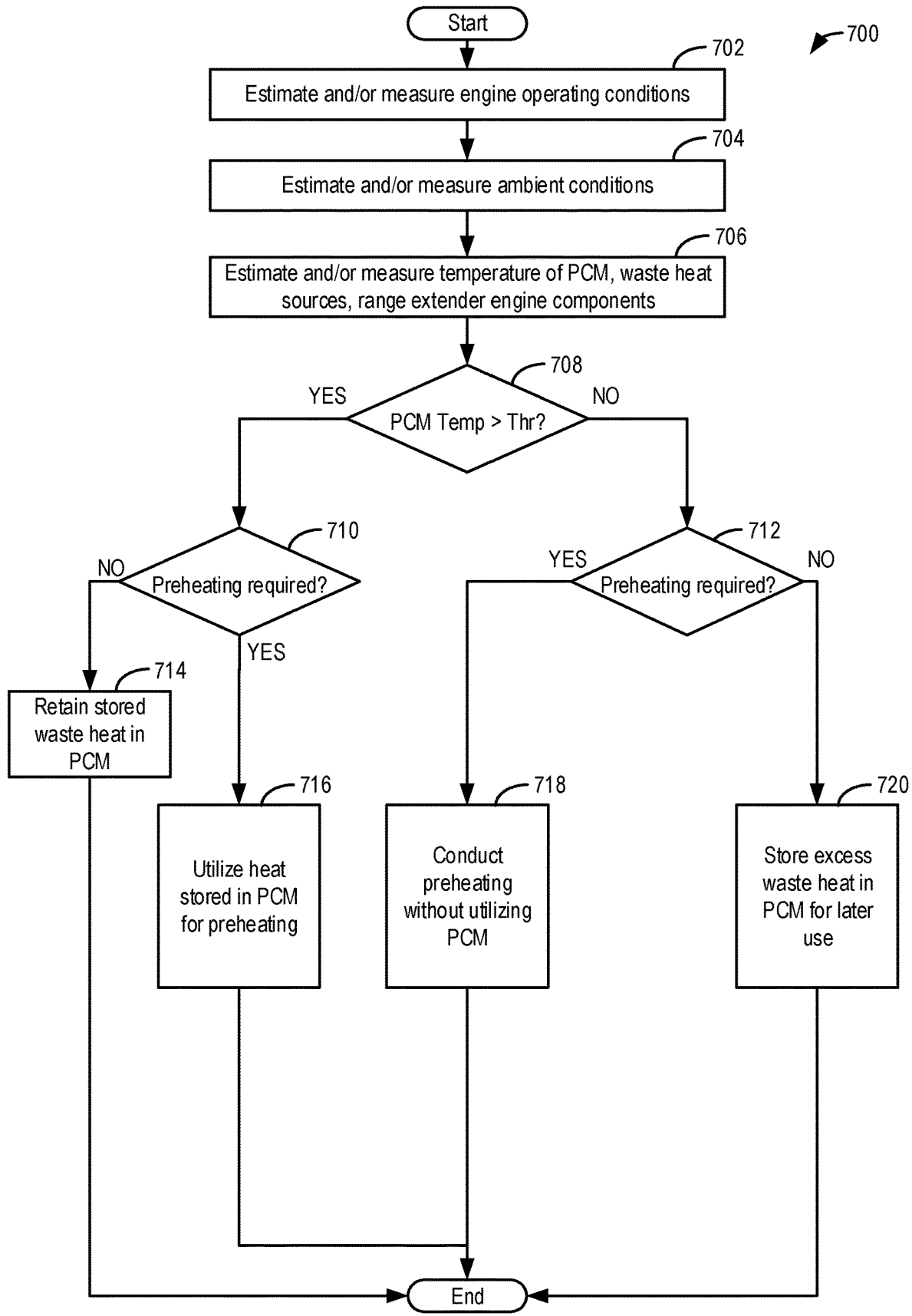
FIG. 7 shows a high level flowchart of an example method for employing a phase change material and associated heat exchanger to store excess waste heat or utilize stored waste heat for preheating of range extender/components.

Controller 190 of heat exchange system 160, may infer the temperatures of the plurality of waste heat sources, the plurality of range extender engine components, and the PCM, based on data received from temperature sensors 260-282 and may actuate pump 164, valves 232-259, and valves 290-294, based on this temperature data according to one or more methods stored in memory, such as method 600 of FIG. 6, and method 700 of FIG. 7. As an example, controller 190 may preheat the range extender engine components by first estimating the available waste heat at a plurality of waste heat sources of a hybrid vehicle, then calculating a portion of the total available waste heat to transfer to each temperature sensitive range extender engine component. The portion of available waste heat transferred to each range extender engine component may be based on vehicle operating conditions, ambient temperature, the current temperature of each range extender engine component (as inferred based on a temperature reading from a temperature sensor, such as one or more of temperature sensors 260-282), and further based on an expected performance benefit obtainable by preheating each component a finite amount. Specifically, the portion of available waste heat transferred to each range extender engine component may increase proportional to the performance benefit obtained thereby, such that a performance function is maximized given the constraints of available waste heat, range extender engine component temperatures, and waste heat source temperatures. The performance function may include one or more, or a weighted combination of, a fuel efficiency benefit, a reduction in engine wear, and an emissions benefit. The controller may also actuate the valves associated with each of the plurality of waste heat sources, such that the flowrate of heat exchange fluid there-through is proportional to the difference between the inferred waste heat source temperature and a threshold temperature, where the threshold temperature may be selected based on the range extender component temperatures, ambient temperature, vehicle operating conditions, etc. In the case that the waste heat source temperature is below a threshold, flow of heat exchange fluid through said waste heat source may be disabled by controller 190 via actuation of the valve associated with that heat source. In another example, controller 190 may store excess waste heat in the PCM for later use. This may occur while little, or no, preheating is required, and while one or more waste heat sources is above a threshold temperature, where the threshold temperature is based on the current inferred temperature of the PCM. Controller 190 may flow heat exchange fluid through waste heat sources with inferred temperatures greater than the threshold temperature, and may then flow this warmed heat exchange fluid through PCM HEX 224 by opening valve 252 and closing valve 292. As the range extender engine components do not require preheating in this example, they are bypassed by closing valves 254-259 and opening valve 294.

In this way, the components of FIGS. 1-2 enable an example vehicle system comprising an electric motor, powered via a battery; an engine coupled to the battery; a heat exchange system including a valve; and a controller with computer readable instructions stored on non-transitory memory for: propelling the vehicle via the electric motor; adjusting a position of the valve to transfer waste heat from the electric motor to pre-heat the engine; and starting the engine, after the pre-heating, responsive to a state of charge of the battery falling below a threshold. The controller may include further instructions for: predicting the starting of the engine based on average motor output, rate of change of battery state of charge, and route of travel parameters; and beginning the transferring of waste heat to pre-heat the engine to a target temperature before the engine start. Further, the controller may include instructions for estimating a magnitude of the waste heat based on each of a duration of operation of the motor, the average motor output, and ambient temperature, wherein the beginning of the transferring is adjusted based on the magnitude of the waste heat.

The components may further enable a vehicle system comprising: an electric motor coupled to vehicle wheels; a battery coupled to the electric motor and an alternator; an engine coupled to the battery via the alternator, the engine including an exhaust catalyst and a cylinder; a heat exchange system including a plurality of heat exchangers, a circulating coolant, and a phase change material; and a controller with instructions stored in non-transitory memory for: while propelling vehicle wheels via the motor on a drive cycle, transferring heat via the heat exchange system from the motor, the alternator, and the battery to pre-heat one or more of the cylinder and the exhaust catalyst to a target temperature before engine start; and after the pre-heating, starting the engine to raise the state of charge of the battery above a threshold charge. The controller may include further instructions for: transferring heat to pre-heat only the cylinder responsive to a first difference between actual cylinder temperature and target cylinder temperature being higher than a second difference between actual catalyst temperature and target catalyst temperature; and transferring heat to pre-heat only the catalyst responsive to the first difference being lower than the second difference. The controller may include further instructions for: predicting a timing of the engine start based on an occurrence of peak torque demand exceeding electrical torque output of the motor on the drive cycle, the occurrence of peak torque demand predicted based on parameters associated with a route of travel on the drive cycle, the electrical torque output of the motor estimated based on the battery state of charge; and adjusting a starting of the transferring of waste heat to complete the preheating before the predicted timing of the engine start. Further, the controller may include instructions for: adjusting a valve of the heat exchanger system to transfer the waste heat from a heat exchanger associated with the motor to the circulating coolant and the phase change material and then from the circulating coolant and the phase change material to one or more of the cylinder and the exhaust catalyst.

Yet another vehicle system that may be enabled comprises: an electric motor coupled to vehicle wheels; a battery coupled to the electric motor and an alternator; an engine coupled to the battery via the alternator; a heat exchange system thermally coupled to the motor and the engine; and a controller with instructions stored in non-transitory memory for: while propelling a vehicle via the electric motor, predicting an engine start time based on an occurrence of peak torque demand exceeding maximum electrical torque output; and prior to the predicted engine start time, transferring waste heat from the electric motor, the battery, and the alternator to pre-heat a plurality of components of the engine, an order of transferring heat to the plurality of engine components selected based on a magnitude of the waste heat and a temperature of the plurality of the engine components. Therein, the order of transferring heat is adjusted to pre-heat each of the plurality of engine components to a corresponding target temperature before the predicted engine start time. Further, the controller may include instructions for: selecting a first engine component for pre-heating having a current temperature closer to the corresponding target temperature; and then selecting a second engine component for pre-heating the current temperature further from the corresponding target temperature.

Finally, the components may also enable a vehicle system comprising: an electric motor; a battery coupled to the electric motor; an engine coupled to the battery via an alternator; a heat exchange system; and a controller with computer readable instructions stored in non-transitory memory for: while propelling the vehicle via the motor, transferring waste heat from the motor, battery, and alternator to the engine via the heat exchange system before starting the engine responsive to an occurrence of peak torque demand exceeding electric torque capacity of the motor in a drive cycle. Alternatively or additionally, the controller may transfer waste heat from the motor, battery, and alternator to the engine via the heat exchange system before starting the engine responsive to an occurrence of torque demand to reach destination of the route exceeding electric torque capacity of the motor. The controller may include further instructions for adjusting a beginning of the transferring of waste heat to pre-heat one or more engine components to a corresponding target temperature before starting the engine. The controller may also include instructions for adjusting an order of transferring the waste heat to the one or more engine components based on a temperature of each of the one or more engine components relative to the corresponding target temperature. The controller may also include instructions for adjusting an interval between the beginning of the transferring of waste heat and the starting the engine based on a state of charge of the battery relative to the torque demand to reach the destination of the route. In one example, the heat exchange system includes a phase change material, and wherein the transferring of the waste heat includes transferring the waste heat from the motor, battery, and alternator to the phase change material while a temperature of the phase change material is below a threshold, and transferring the waste heat from the phase change material to the engine when the temperature of the phase change material is above the threshold.

Figure 3:
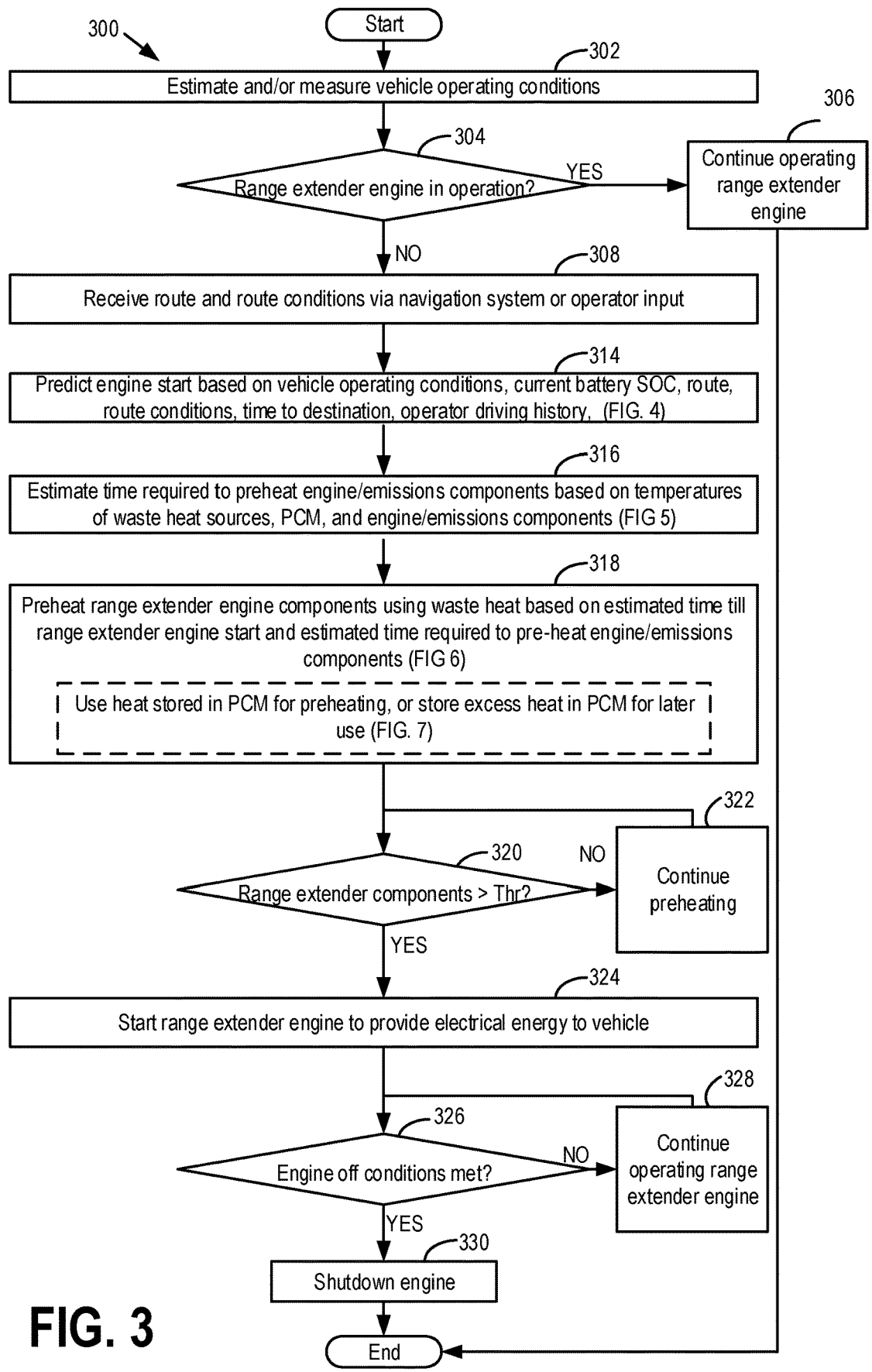
FIG. 3 shows a high level flowchart of an example method for preheating a range extender engine and associated components.

Turning to FIG. 3, an example method 300 is shown for preheating range extender engine components using waste heat, prior to a predicted engine start. Method 300 will be described with reference to the systems described herein and shown in FIGS. 1-2, though it should be understood that similar methods may be applied to other systems without departing from the scope of this disclosure. Instructions for carrying out method 300 and the rest of the methods included herein may be executed by a controller, such as controller 190 of FIGS. 1-2, based on instructions stored in non-transitory memory and in conjunction with signals received from sensors of the engine and heat exchange system, such as temperature sensors, and other sensors described in FIGS. 1-2. The controller may employ actuators of the engine and heat exchange system to adjust engine and heat exchange system operation, according to the methods described below. Method 300 may be carried out by a controller of the vehicle, such as controller 190, to reduce a duration of sub-optimal engine performance following a range extender engine start from ambient or near ambient temperatures. Method 300 controls a heat exchange system of the vehicle to preheat range extender engine components prior to a predicted engine start. To achieve this, the method predicts a range extender engine start time based on a current battery SOC, a current route to a destination, time to reach the destination, route conditions, vehicle operating conditions, and operator driving history. The method further estimates a duration of time required for preheating, this duration estimated based on the temperatures of both the plurality of waste heat sources as well as the plurality of range extender engine components, and further based on ambient conditions, vehicle operating conditions, and final temperatures to be achieved in one or more of the plurality of waste heat sources. The method initiates said preheating based on both the predicted start time and the required duration of preheating, such that preheating is completed (temperature thresholds of one or more range extender engine components met or surpassed) within a threshold of, and before, said predicted engine start.

Method 300 begins at 302, and includes estimating and/or measuring vehicle operating conditions. Vehicle operating conditions may include one or more of vehicle speed, vehicle location, duration of vehicle operation during current drive cycle, etc., various motor conditions, such as motor status (on or off), motor temperature, motor torque, motor speed, etc., various engine conditions, such as engine status (on or off), engine speed, engine temperature, time since previous engine shutdown, time since previous engine start, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc., various battery conditions, such as a current battery state of charge, current battery temperature, etc. Method 300 then proceeds to 304.

At 304, the method includes evaluating if the range extender engine is in operation. As the vehicle employing method 300 is a series type hybrid electric vehicle, the engine may only be operated occasionally to supplement vehicle power, and as such may normally be in an "off" or "standby" status. Evaluating if the engine is currently in operation may include determining if the engine is currently combusting fuel, currently producing torque, currently spinning at a rate greater than a threshold rate, or any other approach conventionally known in the art. If the engine is determined to be in operation at 304, method 300 may then proceed to 306, which includes continuing operating the range extender to provide supplemental power to the vehicle. After 306 method 300 may end. However, if the engine is determined to be in an off state at 304, method 300 may then proceed to 308.

At 308, method 300 includes receiving route and route condition information via a navigation system or operator input. In one example, route information may include a distance and estimated time to a destination, speed limits along the present route, average power requirements to reach the destination and at a plurality of subdivided sections of the current route, elevation changes along the route, etc. As another example, route conditions may include traffic along the present route, road conditions along the route (such as road type, prevalence of potholes, etc.), road temperatures along the route, weather expected along the route, etc. In one example route and route condition information may be obtained based on an operator selected route at the beginning of the drive cycle, and further based upon communication with a wireless electronic network, such as a GPS system, an internet connection, or other such connection enabling access to navigation data and/or route data. In another example, a current route may be ascertained based on operator driving history and vehicle operating conditions, such as based on a record of starting locations and destinations stored as a function of factors such as current vehicle location, time of day, and day of the week. As a more specific example, a vehicle controller may infer a current destination is "work", and a route to said destination, based on the time of day being 7 am, and the starting location of the vehicle being previously designated by the operator as "home". Whether the destination is input directly by the operator, or inferred by the vehicle controller, once a destination and route are acquired, the vehicle controller may proceed to access route information either via a navigation network, or from on board memory. In one example, a time to arrival is determined based on the current destination and route to destination, and further updated based upon route conditions, such as inclement weather, traffic, etc. In another example, based on a time to arrival, and route conditions, an average expected vehicle power demand, and total energy required to reach the destination, may be calculated. Once route and route condition are acquired by a controller of the vehicle, method 300 may then proceed to 314.

At 314, method 300 includes predicting engine start based on vehicle operating conditions, current battery SOC, route, route conditions, time to destination, and operator driving history. An example of such an engine start prediction method is given in more detail by method 400 of FIG. 4. The range extender engine start time may be predicted according to a method appropriate to the current operating mode of the vehicle. For example, while operating in a mode which minimizes range extender operation, the range extender engine may be operated at the latest possible time along the current route, and for a duration sufficient to enable the vehicle to reach the destination while maintaining a battery state of charge within a threshold of, but not below, a lower battery SOC. The lower battery SOC may be a battery SOC below which vehicle propulsion via motor is no longer possible. While operating in such a mode, the range extender engine start time may be predicted based upon the current battery SOC, an estimated power consumption along the current route, a lower battery SOC threshold, a power output of the range extender engine, operator driving history, and a predicted time to reach the current destination. In another example, the vehicle may be operated in a mode which enables a driver demanded torque to be continuously provided, without interruption or lag. While operating in such a mode, the range extender engine start time may be predicted based upon a determined future time, at which a maximum operator demanded torque will exceed the maximum motor torque achievable while relying only on battery power. Prior to such a future time, the range extender engine may be operated to enable said maximum operator demanded torque to be met. As such, while operating in such a mode, the range extender engine start time may be predicted based upon a current battery SOC, a running average rate of battery SOC depletion, an estimated battery SOC at a future time, a maximum torque achievable by a motor being powered solely by a battery having said estimated SOC, and a predicted maximum operator demanded torque. This operator demanded torque further based on an operator driving history, the current route, current route conditions, etc. Once a range extender start time is predicted, method 300 may then proceed to 316.

At 316, method 300 includes estimating the time required to preheat engine/emissions components based on temperatures of waste heat sources, PCM, and engine/emissions components. An example of a method for estimating the duration of preheating required is given in more detail by method 500 of FIG. 5. The duration of preheating may be calculated by a vehicle controller based on the temperatures of one or more of a plurality of waste heat sources, the target temperatures and current temperatures for one or more of the plurality of range extender engine components requiring preheating, vehicle operating conditions, ambient conditions, a total amount of available waste heat, an inferred rate of waste heat generation at the plurality of waste heat sources, and an inferred rate of heat loss at the plurality of range extender engine components. As an example, based on the difference between the current temperature of a catalytic converter and an achievable preheated target temperature of said catalytic converter, and further based upon an amount of available waste heat at the electric motor of the vehicle, a duration of preheating required to attain to within a threshold of the target preheated temperature of the catalytic converter may be calculated based on conventional heat transfer equations. As another example, as the ambient temperature decreases, a duration of preheating required may increase. As another example as the amount of available waste heat decreases, the duration of preheating required may increase. Once the duration of preheating required has been calculated, method 300 may then proceed to 318.

At 318, the method includes preheating the range extender engine components using waste heat based on the predicted engine start time, and the duration of preheating required. An example of a method for preheating range extender engine components using waste heat is given in more detail by method 500 of FIG. 5. Preheating the range extender engine components includes determining an allocation of the available waste heat amongst those components requiring preheating. In one example, the allocation of available waste heat may be based upon a performance benefit expected upon preheating, such that the maximum possible performance benefit may be achieved given a limited amount of waste heat. As an example, predicted performance benefits may include, a reduction in engine wear, a reduction in engine emissions, or an increase in engine efficiency. Said allocation may further including setting one or more target temperature thresholds for the one or more range extender engine components to achieve prior (or exceed) to the predicted engine start time. Preheating may be accomplished by transferring the waste heat available at the plurality of waste heat sources to one or more of the plurality of range extender engine components via operation of a heat exchange system, such as heat exchange system 160 depicted in FIG. 1, and in more detail in FIG. 2. Said operation may include flowing a heat exchange fluid (such as coolant, oil, a phase change material, water, air, or other fluids conventionally used for heat transfer in such systems) through one or more heat exchangers via operation of a pump, such as pump 164. Said operation may also include controlling the rate of heat transfer to the one or more range extender engine components by controlling flow through a heat exchanger associated with said components, such as by action of a valve associated with said heat exchangers. The heat exchange system may additionally include a PCM associated heat exchanger, operation of said heat exchanger transfers heat to and from a PCM reservoir. The PCM may act as a reservoir for excess waste heat to be stored in, and extracted from, depending on the thermal conditions prevailing within the plurality of heat exchangers associated with waste heat sources and range extender engine components. An example method for a storing or utilizing waste heat within a PCM is given in more detail in method 700 of FIG. 7. In one example, a heat exchange fluid may be commanded by the vehicle controller to flow through a PCM associated heat exchanger, thereby extracting heat stored therein. The heat exchange fluid may then be commanded to flow through one or more range extender engine components requiring preheating. Commanding of flow through the PCM associated heat exchanger may be based on one or more of the plurality of waste heat sources being below a temperature threshold, said temperature threshold chosen such that insufficient heat transfer between range extender engine components and waste heat sources at, or below, such a temperature may occur. Method 300 may then proceed to 320.

At 320, method 300 includes evaluating if the range extender components are greater than a threshold temperature. The target threshold temperature for each of the plurality of range extender engine components may have been previously determined by the vehicle controller on an individual component basis, based upon an expected performance benefit attained by reaching said threshold temperature. The temperature may be based on temperature readings from one or more temperature sensors, such as temperature sensors 166, or may be inferred based on vehicle operating conditions (such as current drive cycle duration, motor torque, ambient conditions etc.) according to a model, or a lookup table. If at 320 a determination is made that one or more of the plurality of range extender engine components is below its temperature threshold, then method 300 may proceed to 322, where preheating is continued. Preheating may continue, and the temperature of the plurality of range extender engine components may continue to be evaluated, until all, or a subset, of the plurality of range extender engine components are above said temperature threshold. Once the controller has determined that all, or a subset of, the plurality of range extender engine components are above their preheating threshold temperature, method 300 may proceed to 324.

At 324, method 300 includes starting the range extender engine to provide electrical energy to the vehicle. The range extender engine start time may occur at the time previously predicted. In some cases, the start time may occur at a different time than that predicted, based on an immediate torque demand by the operator exceeding a threshold, or further based on an unexpected sudden decrease in battery SOC, or further based on an unexpected change in destination, route to destination, route conditions, etc. In some cases the range extender engine may start before the plurality of range extender engine components has attained or surpassed their respective target temperature thresholds. In the majority of cases however, the range extender engine will be started at, or within a threshold of, the predicted start time, such that preheating has been completed prior to said start time, and an increased engine efficiency, reduced engine wear, reduced engine emissions, or a combination of two or more, or all, of the benefits may be obtained. Engine start may include spinning the engine up to a threshold speed, via operation of a starter motor, or the motor used to propel the vehicle (such as motor 120), initiating engine fueling via a fuel rail, and or fuel injectors associated with one or more of the cylinders of the engine, and initiating and continuing cylinder combustion via spark, or other combustion initiating mechanism, or approach, conventionally known in the art. Once the range extender engine has been started, method 300 may then proceed to 326.

At 326 method 300 includes, evaluating if engine off conditions are met. Engine off conditions may include a battery state of charge greater than a threshold, a destination being reached, and/or a key off, or vehicle off event. If engine off conditions are not met at 326, method 300 may continue to operate the range extender engine, as at 328 until such time as engine off conditions are met. Upon a determination that engine off conditions are met, the controller of the vehicle may command the engine to shut down, which may include terminating fueling, and spinning the engine to rest, as at 330. Method 300 may then end. In this way, a range extender engine may preheat one or more of the plurality of range extender engine components, a timing of the preheating based on an estimated duration of preheating required, and a predicted engine start time, such that preheating of said components is completed within a threshold of, and prior to, a range extender engine start. The allocation of the heat available at the plurality of waste heat sources may be determined by the vehicle controller according to a predicted benefit obtained by said preheating, such that upon range extender engine start, a maximum performance benefit increase has been attained, given a finite amount of available waste heat. The various sub-methods included within method 300 shall be discussed in more detail in the remaining sections of the current specification, starting with method 400, for predicting the start time of the range extender engine.

Figure 4:
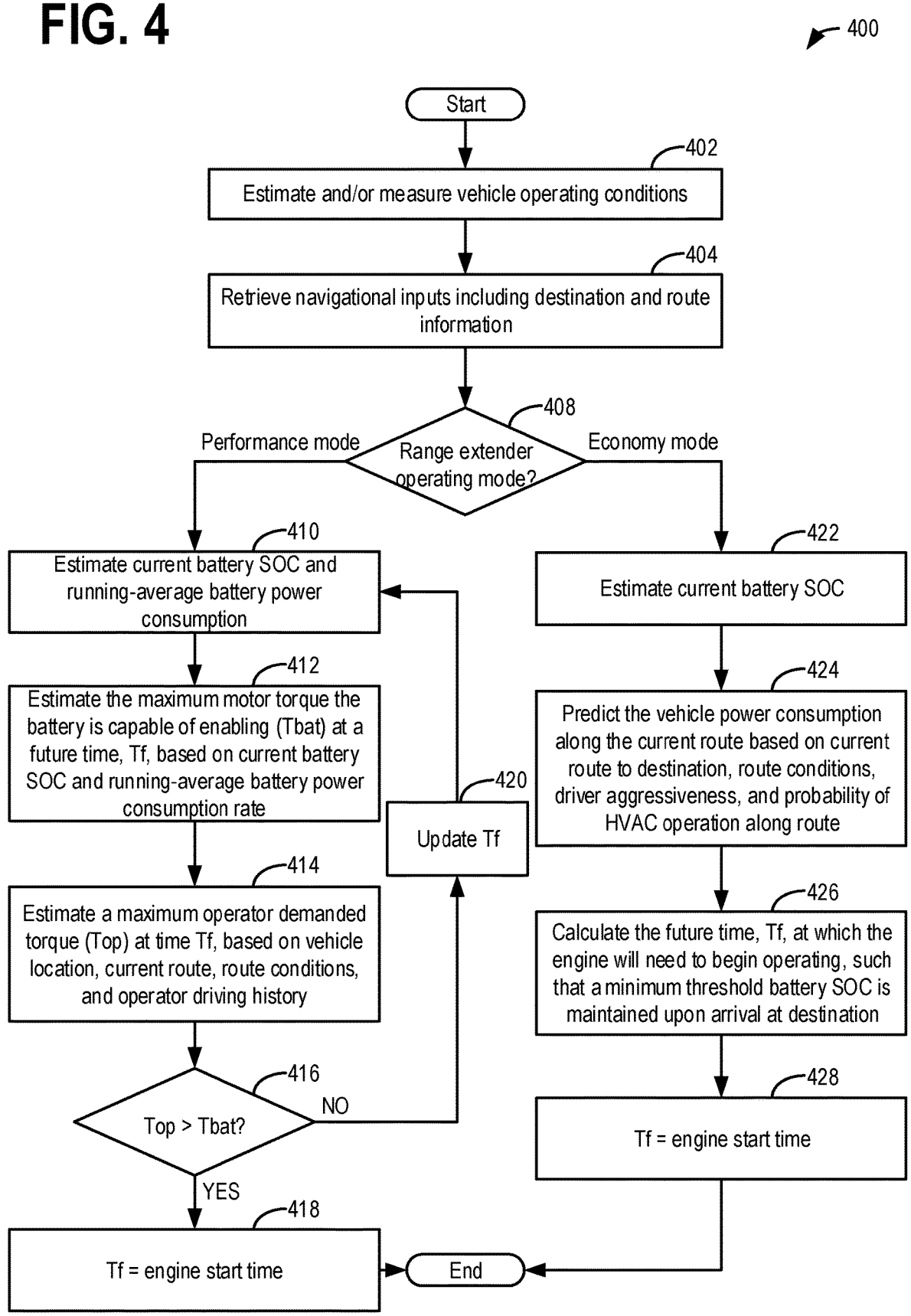
FIG. 4 shows a high level flowchart of an example method for predicting range extender engine start time.

Turning to FIG. 4, an example method 400 for predicting the start time of a range extender engine of a series type hybrid electric vehicle is shown. Method 400 may be included entirely, or in part, in method 300, such as at 314. Method 400 enables more accurate prediction of range extender engine start on time scales long enough to enable preparatory preheating. Said accuracy is achieved by incorporating operator driving history, vehicle location, information regarding a current route to a destination, conditions of said route, vehicle operating conditions, battery status (including SOC, rate of SOC depletion etc.), and range extender engine parameters (such as maximum power output), into the calculations of the predicted start time.

Method 400 begins at 402, and includes estimating and/or measuring vehicle operating conditions. Vehicle operating conditions may include one or more of vehicle speed, vehicle location, duration of vehicle operation during current drive cycle, etc., various motor conditions, such as motor status (on or off), motor temperature, motor torque, motor speed, etc., various engine conditions, such as engine status (on or off), engine speed, engine temperature, time since previous engine shutdown, time since previous engine start, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc., various battery conditions, such as a current battery state of charge, current battery temperature, etc. Method 400 then proceeds to 404.

At 404, method 400 includes retrieving route and route condition information via a navigation system or operator input. In one example, route information may include a current vehicle location, a distance and estimated time to the destination based on vehicle location and current route, speed limits along the present route, average power requirements to reach the destination and at a plurality of subdivided sections of the current route, elevation changes along the route etc. As another example, route conditions may include traffic along the present route, road conditions along the route (such as road type, prevalence of potholes, etc.), road temperatures along the route, weather expected along the route. In one example route and route condition information may be obtained based on an operator selected route, and further based upon communication with a wireless electronic network, such as a GPS system, an interne connection, or other such connection enabling access to navigation data and/or route data. In another example, a current route may be ascertained based on operator driving history and vehicle operating conditions, such as based on a record of starting locations and destinations stored as a function of factors such as current vehicle location, time of day, and day of the week. As a more specific example, a vehicle controller may infer a current destination is "work", and a route to said destination, based on the time of day being 7 am, and the starting location of the vehicle being previously designated by the operator as "home". Whether the destination is input directly by the operator, or inferred by the vehicle controller, once a destination and route are acquired, the vehicle controller may proceed to access route information either via a navigation network, or from on board memory. In one example, a time to arrival is determined based on the current destination and route to destination, and further updated based upon route conditions, such as inclement weather, traffic, etc. In another example, based on a time to arrival, and route conditions, an average expected vehicle power demand, and total energy required to reach the destination, may be calculated. Once route and route condition are acquired by a controller of the vehicle, method 400 may then proceed to 408.

At 408, method 400 includes evaluating the selected operating mode of the range extender engine. In example method 400, two operating modes are shown, those being "performance mode", and "economy mode". Performance mode is herein defined to be a mode for operating a range extender engine based on providing an operator demanded torque, continuously and without interruption, even if such operation does not maximize range extender fuel efficiency. In performance mode, a series type hybrid electric vehicle may be operated more aggressively, without encountering the torque limitations which may be associated with aggressive operation of such vehicles. This torque limitation is prevented by operating the range extender engine to provide additional power to the motor on an as needed basis. In other words, in performance mode, range extender operation may occur intermittently during a single drive cycle based upon the torque demands of the operator, in relation to the torque capable of being provided solely by the battery. The alternative operating mode, referred to as economy mode, is herein defined as a mode of range extender engine operation which attempts to maximize the fuel efficiency of the range extender engine. Fuel efficiency of said range extender engine may be maximized by operating the range extender engine only as necessary to ensure the vehicle reaches the current destination. In one example this may include not operating the range extender at all during a drive cycle, if such operation is not needed for the vehicle to reach its current destination. In another example this may include starting the range extender engine as late as possible during the current trip, operating the engine continuously till the destination is reached, and operating for a minimum possible duration such that a battery SOC is maintained just above a minimum threshold, below which vehicle operation may be impeded. The operating mode of the range extender engine may be chosen by the operator, or may be selected based upon vehicle operating conditions by a controller of the vehicle. If at 408 the controller determines that the vehicle is in a performance mode, method 400 may then proceed to 410.

At 410, method 400 includes estimating the current battery SOC and running-average battery power consumption rate. As an example, the running-average battery power consumption rate may be calculated in real time, over a previous portion of the current drive cycle, such as over the last 10 minutes. In an example, based on a known SOC at a previous point in time, and further based on an integrated discharge current, a current battery SOC may be estimated. In a more detailed example, the discharge current may be estimated as a function of the power delivered to the wheels, via the motor, and as such may also be estimated based on the current route, route conditions, vehicle operating conditions, vehicle speed, and ambient conditions. In another example, based on a direct measurement of one or more battery properties, such as an open circuit voltage and battery temperature, a current battery SOC may be estimated. The running-average battery power consumption rate can be estimated based on a time trajectory of the battery SOC. In one example, by recording estimated battery SOCs as a function of time, a battery SOC time trajectory may be obtained. In one example, by dividing a total change in battery SOC by a corresponding period of time, over which said SOC change occurred, an average rate of battery SOC depletion may be estimated. In another example, by taking a derivative of the battery SOC time course an expected future average rate of battery SOC depletion may be calculated. Method 400 may then proceed to 412. In another example, the running average rate of battery SOC depletion may be calculated by dividing the change in battery SOC during a period of time immediately preceding the current time, by the total duration of said period. In this way both the battery SOC, and its rate of depletion may be estimated. Method 400 may then proceed to 412.

At 412, method 400 includes estimating the maximum motor torque the battery is capable of enabling (Tbat) at a future time, Tf, based on current battery SOC and running-average battery power consumption. The future time, Tf, may be selected such that range extender engine component preheating may occur between the present time and the future time, Tf. In one example, Tf may be 15 minutes from the present time. Based on this future time, and further based on the current battery SOC and average rate of battery SOC depletion, a battery SOC at Tf may be estimated. In one example, the running average rate of battery SOC depletion is multiplied by the difference in time between the present and the future time, this product is then subtracted from the current battery SOC, this obtaining an estimate of the future battery SOC. In other examples, the future battery SOC may be obtained by extrapolating from non-linear regression of the battery SOC time trajectory to the future time. Finally, the estimated future battery SOC is used to determine a maximum motor torque capable of being produced by the motor if powered solely by the battery (Tbat). Tbat estimates a future maximum motor torque achievable if the range extender engine remains off, and the motor receives power only from the battery. In one example, the relationship between battery SOC and maximum achievable motor torque may be stored in non-transitory memory of the controller as a lookup table. In another example, a maximum achievable motor torque may be calculated as a function of battery SOC according to one or more models stored in the memory of the controller. In a third example, a neural network, or other adaptive network, of the vehicle controller may output a maximum achievable motor torque based upon the estimated future battery SOC. Once the controller has estimated a maximum achievable future motor torque capable of being provided solely by battery power, Tbat, method 400 may then proceed to 414.

At 414, method 400 includes estimating a maximum operator torque demand, Top, at the previously selected future time, Tf, based on vehicle location, current route, route conditions, and operator driving history. In one example, Top is estimated as the $95^{th}$ percentile of a group of vehicle use cases based on current vehicle location. In another example, Top is estimated as the $95^{th}$ percentile of a group of real world vehicle use cases based on the current route conditions, including grade, altitude, temperature, etc. In another example, Top is estimated based on a running average of operator torque demand in conjunction with average vehicle torque demand along the current route. In a more detailed example, based on operator driving history indicating operator maximum torque demand exceeding the average torque demand for a given route by a ratio, Top may be estimated by multiplying the average torque demand to be encountered along the present route, at time Tf, by said ratio. Said ratio may further be adjusted by one or more factors incorporating current route conditions, vehicle operating conditions, operator history statistics, etc. Method 400 may then proceed to 416.

At 416, method 400 includes evaluating if Top is greater than Tbat for the selected future time Tf. If at 416 the controller determines that Top is less than Tbat, then the controller may determine that the range extender engine does not need to be started prior to the future time Tf, and method 400 may update Tf (such as by incrementing Tf a predetermined amount), as at 420, and return to 410, where the controller will proceed to calculate new Top and Tbat values based on the updated Tf. However, if at 416 the controller determines that Top is greater than Tbat, implying at time Tf the battery may be unable to provide an operator demanded torque, method 400 may then proceed to 418.

At 418, method 400 includes setting the time at which the range extender engine will need to be operated to provide supplemental power to the vehicle equal to Tf. Method 400 may then end. Returning to the first decision branch of method 400, at 408, if the range extender engine is determined to be operating in economy mode, method 400 may proceed to 422.

At 422, method 400 includes estimating the current battery SOC, as discussed in more detail above at 410. Once the current battery SOC is estimated, method 400 may then proceed to 424.

At 424, method 400 includes predicting the vehicle power consumption along the current route based on route conditions, driver aggressiveness, and probability of HVAC operation, or other accessory electrical devices operating along the current route. In one example, average power requirements for a current route are based on data collected from one or more previous trips, along all, or part, of the current route, collected by this, or other, vehicles. In another example, average power requirement data may be indexed based on route conditions, or average power requirements may be adjusted by a factor to account for altered route conditions, such as inclement weather, traffic, ambient temperature etc. In another example, the power requirement at a one or more subdivisions of the current route may be based on a model, said model giving a power requirement for said route subdivision as a function of one or more variables, such as vehicle mass, vehicle speed, route conditions (including road grade, weather, altitude, speed along route etc.), ambient temperature, vehicle operating conditions etc. Further, the controller may account for accessory electrical device operation, which may impose an additional electrical load on the battery. In one example, an HVAC may be operated during a drive cycle, increasing the total power required along said route, operation of such accessory electrical devices may be predicted based on vehicle operating history as a function of route, vehicle operating conditions, operator preferences, ambient conditions etc. Once the controller has determined the average power requirements along the present route, a total energy required to reach a current destination may also be calculated. Method 400 may then proceed to 426.

At 426, method 400 includes calculating the future time, Tf, at which the range extender engine will need to provide supplemental power to the vehicle, based on the average power required along the current route, the total energy required to reach the destination, operator driving history, the current estimated battery SOC, and a minimum SOC threshold, such that the range extender is operated for the minimum possible duration while still ensuring the vehicle reaches the destination with the battery SOC above a minimum SOC threshold. In one example, based on a current battery SOC of 3 kW Hrs of useful energy, a time to reach a current destination of 2 Hrs, a total average power consumption along the present route of 2 kW, and a range extender power output of 2 kW, and further based on an adjustment factor of 1.25, which incorporates route conditions and operator drive history, the total energy required to reach the destination will be 1.25×2 kW×2 Hrs=5 kW Hrs. This implies an energy deficit of 5 kW Hrs−3 kW Hrs=2 kW Hrs, which will need to be provided by the range extender engine. Since the range extender engine provides an average power output of 2 kW, this means the range extender engine will need to be provide supplemental power for 1 hour to enable the vehicle to reach its current destination, and therefore the expected Tf, as based on these calculations would be 1 hour from the present time. In another example, a second duration of range extender engine preheating may occur subsequent to the heat exchange system mediated preheating. This second duration of preheating may after the heat exchange mediated preheating, while the range extender engine is combusting fuel, prior to Tf, at which time the range extender engine may need to be operated at maximal power to supplement the vehicles power demand and ensure the current destination is reached. Method 400 may then proceed to 428.

At 428, method 400 includes setting the predicted time at which the range extender engine will need to be operated to provide supplemental power to the vehicle to Tf, as calculated at 426. Method 400 may then end.

In this way a controller employing method 400 may more accurately predict a starting time of a range extender engine by basing such a prediction on the current operating mode of the range extender engine, operator driving history, the current vehicle location, the current route to a destination, current route conditions, ambient conditions, vehicle operating conditions, and battery state of charge. By more accurately predicting the starting time of the range extender engine, range extender engine component preheating may be scheduled accordingly, based on a required duration of preheating, such that preheating is completed prior to, and within a threshold time of, the predicted start time.

Figure 5:
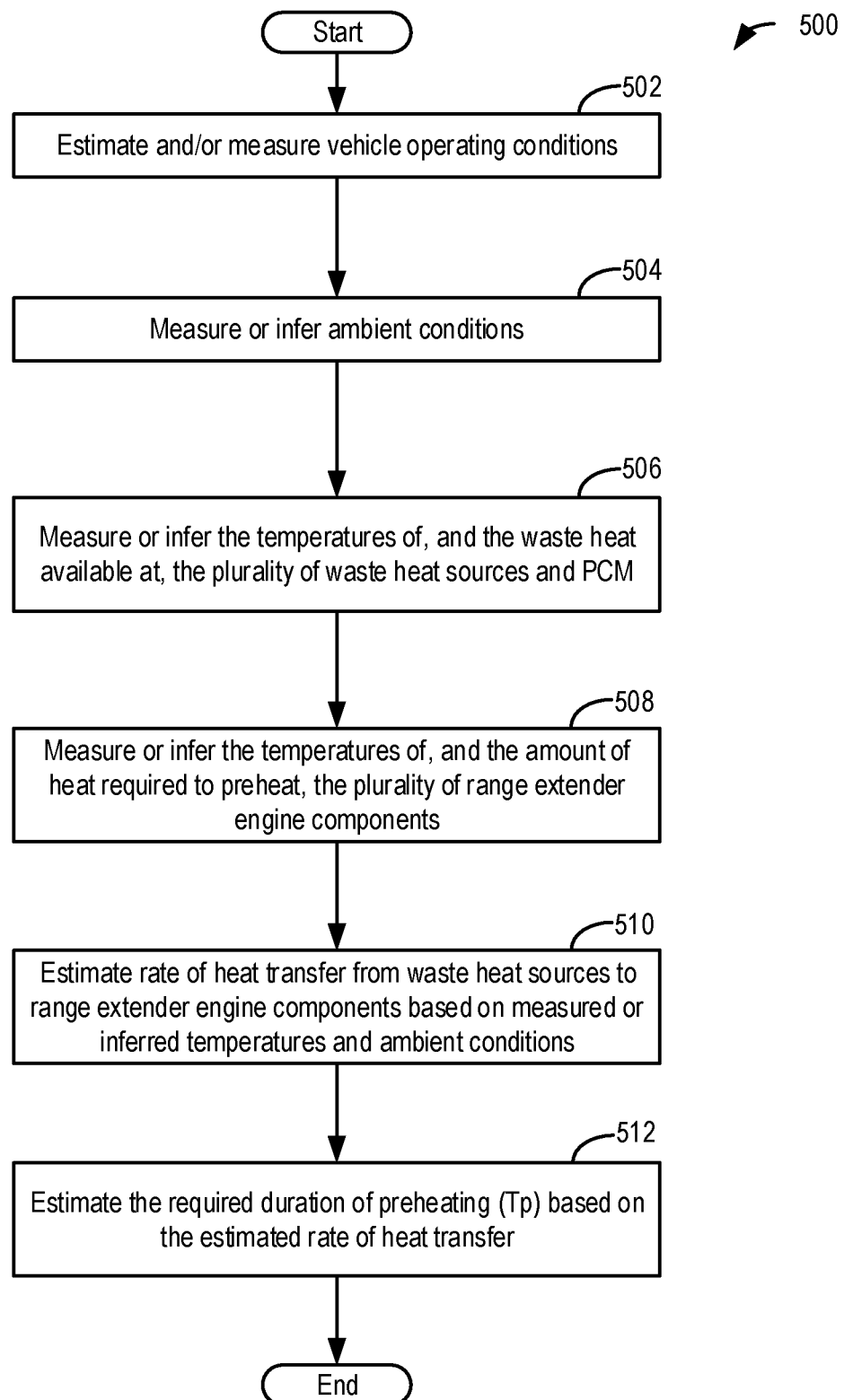
FIG. 5 shows a high level flowchart of an example method for estimating the duration of engine/component preheating.

Turning now to FIG. 5, an example method 500 is given, whereby the controller of a vehicle may calculate a duration of preheating required to raise the temperatures of one or more, or all, of a plurality of range extender engine components to above their respective threshold temperatures using waste heat. Said preheating duration is also herein referred to as the required duration of preheating. The controller may calculate this required duration of preheating based on the waste heat available at a plurality of waste heat sources, the temperatures of these waste heat sources, the amount of heat required by each of the plurality of range extender engine components, the current temperatures of the plurality of range extender engine components, ambient conditions, and vehicle operating conditions. Method 500 may be included entirely, or in part, in a method for preheating range extender engine components, the scheduling of said preheating based on a required duration of preheating, and further based on a predicted engine start time, such as at 316 of method 300.

Method 500 begins at 502, and includes estimating and/or measuring vehicle operating conditions. Vehicle operating conditions may include one or more of vehicle speed, vehicle location, duration of vehicle operation during current drive cycle, etc., various motor conditions, such as motor status (on or off), motor temperature, motor torque, motor speed, etc., various engine conditions, such as engine status (on or off), engine speed, engine temperature, time since previous engine shutdown, time since previous engine start, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc., various battery conditions, such as a current battery state of charge, current battery temperature, etc. Method 500 may then proceed to 504.

At 504, method 500 includes, measuring or inferring ambient conditions. Ambient conditions may include the temperature of the ambient air, the prevailing barometric pressure, the humidity, wind and weather conditions, etc. Ambient conditions may be measured or inferred by the vehicle controller based on output from one or more vehicle sensors. In one example, the air temperature may be estimated based on output from one or more vehicle temperature sensors. In another example, the barometric pressure may be measured or inferred based on output from one or more vehicle pressure sensors, such as an intake manifold pressure sensor. In yet another example, ambient conditions may be obtained via connection to a wireless network, which may include access to a navigation/weather system. Method 500 may then proceed to 506.

At 506, method 500 includes measuring or inferring the temperatures of, and the waste heat available at, the plurality of waste heat sources and PCM. Measuring or inferring the temperatures of the plurality of waste heat sources may include estimating a rate of temperature change of said waste heat sources. In one example said waste heat sources include those vehicle components which may be at an elevated temperature in a vehicle operated in an electric only mode (propelled entirely via motor torque). In a more specific example, waste heat sources may include, an electric motor, a battery, a transmission, an inverter, an alternator, a PCM reservoir, and may further include heat exchangers coupled to one or more seats or cup holders within the vehicle cabin, to a one or more lights of the vehicle, to the HVAC system of the vehicle, to a breaking mechanism of the vehicle, etc. In one example said temperatures may be measured based on output from a plurality of temperature sensors, such as temperature sensors 260-282 of heat exchange system 160, associated with one or more, or all, of the plurality of waste heat sources. In another example, the temperatures of the plurality of waste heat sources may be inferred based on the cumulative motor output during the current drive cycle. In yet another example, the temperature of the plurality of waste heat sources may be inferred based on duration of the current drive cycle. The controller may further estimate the total waste heat available at the plurality of waste heat sources based on the measured or inferred temperatures of said waste heat sources. In one example, the controller may estimate the waste heat available at one or more of the plurality of waste heat sources by referencing a lookup table, or model, wherein an amount of available heat is given as a function of the ambient temperature, the waste heat source being evaluated, and the current temperature of said waste heat source. In another example, the controller may estimate the waste heat available at a waste heat source based on the duration of operation of said waste heat source, and further based on the vehicle operating conditions and ambient conditions. In a more detailed example, the waste heat available at the motor may be estimated based on the duration of motor operation, and further based on ambient air temperature, and the torque output of the motor. Once the temperatures of, and waste heat available at, the plurality of waste heat sources is measured, inferred, or estimated, method 500 may then proceed to 508.

At 508, method 500 includes measuring or inferring the temperatures of, and the amount of heat required to preheat, the plurality of range extender engine components. Measuring or inferring the temperatures of the plurality of range extender engine components may include estimating a rate of temperature change of said components. In one example, range extender engine components to be preheated may include those components of the range extender engine which possess an optimal operating temperature substantially higher than the ambient temperature. In a more specific example, said range extender engine components may include one or more combustion chambers, oxygen sensors (such as UEGO sensors), one or more fuel rails/injectors, one or more exhaust gas treatment catalysts, etc. In one example said temperatures may be measured by one or more of a plurality of temperature sensors, such as temperature sensors 260-282 of heat exchange system 160, associated with one or more, or all, of the plurality of range extender engine components. In another example, the temperatures of the plurality of range extender engine components may be inferred based on the ambient air temperature, and further based on the temperatures of waste heat sources in the proximity of said range extender engine components. The controller may further estimate the total heat required for preheating the plurality of range extender engine components based on the measured or inferred temperatures of said components, and further based on a lookup table or model, capable of yielding a total amount of heat required given a current temperature, a target temperature threshold, and a unique identifier indicating to the controller which range extender engine component is being evaluated. Once the temperatures, and heat required for preheating, at the plurality of range extender engine components is measured, inferred, or estimated, method 500 may then proceed to 510.

At 510, method 500 includes estimating the rate of heat transfer from waste heat sources to range extender engine components based on measured or inferred temperatures of said waste heat sources and range extender engine components and further based on ambient conditions. In one example, the rate of heat transfer may be calculated according to one or more heat transfer equations/models stored in a memory of the vehicle controller, such heat transfer equations or models being conventional in the art. In a further example, said heat transfer equations may give the rate of heat transfer to one or more of the plurality of range extender engine components as a function of the inferred temperatures of the waste heat sources, the inferred temperatures of the range extender engine components, the inferred available heat contained in the plurality of waste heat sources, the ambient temperature/conditions, and the rate of fluid flow within the one or more heat exchangers of the heat exchange system. In another example, the rate of heat transfer between waste heat sources and range extender engine components increases as the difference in temperature between the waste heat sources and range extender engine components increases. In another example, the rate of heat transfer is reduced based on a low ambient temperature, as an increased amount of heat loss to the environment may occur during heat transference in such cases. In yet another example, the rate of heat transfer may be adjusted based on the ambient air temperature in conjunction with the ambient air humidity, as the heat capacity of air increases with humidity, the effect of ambient air temperature will be increased in more humid ambient air. Once the rate of heat transfer to the plurality of range extender engine components is estimated, method 500 may then proceed to 512.

At 512, method 500 may include estimating the required duration of preheating based on the estimated rate of heat transfer. The required duration of preheating may be further based on the target temperatures to be achieved via preheating of the one or more of the plurality of range extender engine components. In one example the target temperatures may be based on a performance benefit maximizing allocation of the available waste heat. Said performance benefit maximizing allocation determined by a controller of the vehicle based on the total available waste heat, and the inferred or measured temperatures of the plurality of waste heat sources, and range extender engine components. In one example, one or more of the range extender engine components may have an associated performance function stored in a memory of the controller, said performance function giving a relative performance of said range extender engine component as a function of temperature. In another example, there may be multiple performance functions, where each performance function gives a different performance metric as output. In one example, the performance metric may be a relative fuel efficiency, emissions reduction efficiency, degree of engine wear reduction, or degree of component accuracy (such as in the case of a sensor). In another example, based on a higher target temperature, or a lower rate of heat transfer, the required duration of preheating may increase. In another example, based on a lower target temperature, or a higher rate of heat transfer, a required duration of preheating may decrease. Once the required duration of preheating has been estimated method 500 may then end.

Although not explicitly indicated by example method 500, an additional period of time may be added to the required duration of preheating, this additional period allowing for one or more of the range extender engine components to further increase in temperature (and thereby obtain an additional performance benefit) following the range extender engine start. The range extender engine start presently referred to may occur prior to the predicted time of range extender engine start elsewhere referred to, and may allow the range extender engine a period of time in which to further warm-up/preheat prior to a greater load being placed on said engine. An adjustment to the scheduling of preheating may be made in such cases, to account for the additional period of "post ignition" engine warm-up, such that both pre ignition and post ignition engine preheating/warm-up is completed prior to, and within a threshold of, the predicted engine start time. As used herein, "pre ignition preheating" refers to the preheating accomplished via transference of waste heat, while "post ignition preheating" refers to heating accomplished via heat generated via combustion within the range extender engine.

In this way a required duration of range extender engine component preheating is accurately estimated by a controller of the vehicle, enabling said preheating to be scheduled based on the estimated required duration of preheating, and further based on the predicted engine start time, such that preheating is completed within a threshold of, and prior to, the predicted engine start. This may also result in a reduction of sub-optimal engine performance, and increased engine wear, immediately following range extender engine start from sub-optimal temperatures. Once scheduled, preheating of the range extender engine components via waste heat may be conducted by operation of a heat exchange system, such as heat exchange system 160, according to one or more methods stored in memory of the vehicle controller, such as method 600 depicted by a high level flowchart in FIG. 6, and discussed in more detail below.

Turning now to FIG. 6, an example method 600 for implementation by a vehicle controller of a series type hybrid electric vehicle is shown. Method 600 may enable a performance benefit to one or more of a plurality of range extender engine components upon range extender engine start. This performance benefit may be relative to the performance of said one or more range extender engine components in the case of a range extender engine start from ambient temperature, without any preheating. Method 600 enables said performance increase by transferring waste heat available at a plurality of waste heat sources, to one or more of a plurality of range extender engine components, via operation of a heat exchange system, such as heat exchange system 160. The transference of the available waste heat may be based on a performance benefit maximizing allocation of said waste heat, such that the range extender engine efficiency (or other performance metric) is maximized, given a finite amount of available waste heat. Method 600 may be included entirely, or in part, in a method for preheating range extender engine components, the scheduling of said preheating based on a required duration of preheating, and further based on a predicted engine start time, such as at 318 of method 300.

Method 600 begins at 602 and includes estimating and/or measuring vehicle operating conditions. Vehicle operating conditions may include one or more of vehicle speed, vehicle location, duration of vehicle operation during current drive cycle, etc., various motor conditions, such as motor status (on or off), motor temperature, motor torque, motor speed, etc., various engine conditions, such as engine status (on or off), engine speed, engine temperature, time since previous engine shutdown, time since previous engine start, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc., various battery conditions, such as a current battery state of charge, current battery temperature, etc. Method 600 may then proceed to 604.

At 604, method 600 includes measuring or inferring ambient conditions. Ambient conditions may include the temperature of the ambient air, the prevailing barometric pressure, the humidity, wind and weather conditions, etc. Ambient conditions may be measured or inferred by the vehicle controller based on output from one or more vehicle sensors. In one example, the air temperature may be estimated based on output from one or more vehicle temperature sensors, such as an intake air temperature sensor coupled to an engine intake passage. In another example, the barometric pressure may be measured or inferred based on output from a barometric pressure sensor coupled to the intake passage of the engine. In yet another example, ambient conditions may be obtained via connection to a wireless network, which may include access to a navigation/weather system. Method 600 may then proceed to 606.

At 606, method 600 includes measuring or inferring the temperatures of, and the waste heat available at, the plurality of waste heat sources and PCM. The waste heat available may be inferred based on the temperature of the various waste heat sources, as well as based on their operating conditions, and operating duration. For example, the amount of waste heat available at the electric motor may be inferred based on its duration of operation on the current drive cycle, the power output of the motor during the current drive cycle, and/or the amount of electrical energy consumed by the motor during the current drive cycle. In another example, the temperature of the vehicle seat associated heat exchanger may be inferred via output a one or more temperature sensors associated with the vehicle seat associated heat exchanger. Measuring or inferring the temperatures of the plurality of waste heat sources may include estimating a rate of temperature change of said waste heat sources. In one example said waste heat sources include those vehicle components which may be at an elevated temperature in a vehicle operated in an electric only mode (propelled entirely via motor torque). In a more specific example, waste heat sources may include, an electric motor, a battery, a transmission, an inverter, an alternator, a PCM reservoir, and may further include heat exchangers coupled to one or more seats or cup holders within the vehicle cabin, to a one or more lights of the vehicle, to the HVAC system of the vehicle, to a breaking mechanism of the vehicle, etc. In one example said temperatures may be measured based on output from a plurality of temperature sensors, such as temperature sensors 260-282 of heat exchange system 160, associated with one or more, or all, of the plurality of waste heat sources. In another example, the temperatures of the plurality of waste heat sources may be inferred based on the cumulative motor output during the current drive cycle. In yet another example, the temperature of the plurality of waste heat sources may be inferred based on duration of the current drive cycle. The controller may further estimate the total waste heat available at the plurality of waste heat sources based on the measured or inferred temperatures of said waste heat sources. In one example, the controller may estimate the waste heat available at one or more of the plurality of waste heat sources by referencing a lookup table, or model, wherein an amount of available heat is given as a function of the ambient temperature, the waste heat source being evaluated, and the current temperature of said waste heat source. Once the temperatures of, and waste heat available at, the plurality of waste heat sources is measured, inferred, or estimated, method 600 may then proceed to 608.

At 608, method 600 includes measuring or inferring the temperatures of, and the amount of heat required to preheat, the plurality of range extender engine components. Measuring or inferring the temperatures of the plurality of range extender engine components may include estimating a rate of temperature change of said components. In one example, range extender engine components to be preheated may include those components of the range extender engine which possess an optimal operating temperature substantially higher than the ambient temperature. In a more specific example, said range extender engine components may include one or more combustion chambers, oxygen sensors (such as UEGO sensors), one or more fuel rails/injectors, one or more exhaust gas treatment catalysts, etc. In one example said temperatures may be measured by one or more of a plurality of temperature sensors, such as temperature sensors 260-282 of heat exchange system 160, associated with one or more, or all, of the plurality of range extender engine components. In another example, the temperatures of the plurality of range extender engine components may be inferred based on the ambient air temperature, and further based on the temperatures of waste heat sources in the proximity of said range extender engine components. The controller may further estimate the total heat required for preheating the plurality of range extender engine components based on the measured or inferred temperatures of said components, and further based on a lookup table or model, capable of yielding a total amount of heat required given a current temperature, a target temperature threshold, and a unique identifier indicating to the controller which range extender engine component is being evaluated. The controller may additionally determine a sequence, or order, for said preheating, such that a priority of preheating is determined for each of the range extender engine components. In an example, the range extender engine component with the highest assigned priority of preheating may be the first to receive preheating, and the range extender engine component with the lowest priority may receive preheating last. Said priority may be based on a predicted temperature at the time of predicted range extender engine start, or may be based on the predicted temperature increase following engine start, or may further be based on the anticipated performance of said component upon range extender engine start. Once the temperatures, and heat required for preheating, at the plurality of range extender engine components is measured, inferred, or estimated, method 600 may then proceed to 610.

At 610, method 600 includes calculating an allocation of available waste heat amongst the plurality of range extender engine components based on a predicted performance benefit obtained thereby. In one example, calculating the allocation of available waste heat includes dividing the total available waste heat into a plurality of portions, where the sum of the portions is equal to, or less than, the total available waste heat, and where one or more, or each, of the plurality of portions may correspond to one, or more, or each, of the plurality of range extender engine components to be preheated. In another example, the portion of waste heat to be transferred to a range extender engine component increases as the predicted benefit of said transference increases. As an example, predicted performance benefits may result from a temperature increase in one or more of the range extender engine components, and may include, a predicted reduction in engine wear (resulting from reduced friction in a warmed engine versus a cold engine), a reduction in engine emissions, or an increase in engine efficiency. In another example a controller of the vehicle may calculate that range extender engine efficiency will be maximized by transferring all available waste heat to the combustion chambers of the range extender engine, as opposed to transferring the available waste heat equally amongst all range extender engine components. This determination may be based on predicted high engine load expected upon start up, and thus preheating the combustion chambers offers a larger engine efficiency benefit than heating the other range extender engine components. In another example, a low engine load is expected upon engine start up, and thus the vehicle controller may determine that a substantial emissions reduction may be achieved by preheating an exhaust catalyst of the engine, and that preheating the combustion chambers of the engine may not produce a significant performance benefit. In this way, the controller of the vehicle may allocate a distribution of the available waste heat to the range extender engine components based on a predicted performance benefit, and further based on vehicle operating conditions. In another example, calculating an allocation of the available waste heat includes calculating a target temperature, predicted to be achieved upon transference of said portion of waste heat into said range extender engine components. The predicted benefit may be calculated based on a performance function stored in memory of the controller, said performance function relating a performance of a range extender engine component to a temperature of said component, where the performance may be normalized by dividing by the maximum possible performance. In another example, there may be multiple performance functions, where each performance function gives a different performance metric as output. In one example, the performance metric may be a relative fuel efficiency, emissions reduction efficiency, degree of engine wear reduction, or degree of component accuracy (such as in the case of a sensor). In another example, the allocation of waste heat may be based on maximizing a weighted composite function, composed of a linear combination of the performance functions for one or more, or all, of the range extender engine components. Method 600 may then proceed to 612.

At 612, method 600 includes transferring heat from waste heat sources to range extender engine components. In one example, transferring heat from waste heat sources to range extender engine components is achieved by operating a heat exchange system, such as heat exchange system 160. Said operating may include flowing heat exchange fluid through one or more of the plurality of heat exchangers associated with waste heat sources and range extender engine components. The operating of said heat exchange system may include operating one or more pumps associated with said heat exchange system, such as pump 164. In another example, operating the one or more pumps associated with the heat exchange system may include commanding a duty cycle to the pump based on the amount of heat to be transferred, vehicle operating conditions, a battery SOC, and ambient conditions. By operating the heat exchange system to transfer the available waste heat to the plurality of range extender engine components, according to the performance maximizing allotment calculated in 610, a duration of suboptimal engine performance associated with engine cold starts may be mitigated. Method 600 may then proceed to 614.

At 614, method 600 includes adjusting the rate of heat transfer out of waste heat sources based on the inferred/measured temperatures of said waste heat sources. In one example, when heat transfer is achieved via operation of a fluidically coupled network of heat exchangers, such as in heat exchange system 160, adjusting the rate of heat transfer out of waste heat sources may include adjusting a position of a valve, or valves, associated with heat exchangers in thermal contact with said waste heat sources, and thereby adjusting the flow of a heat exchange fluid through said heat exchangers. In a further example, adjusting the rate of heat transfer out of waste heat sources based on the inferred temperature of said waste heat sources may include reducing, or entirely disabling flow of heat exchange fluid through one or more waste heat source associated heat exchangers based upon an indication that the temperature at said waste heat sources is below a threshold. Said threshold may be chosen based on the temperatures at one or more range extender engine components, such that a waste heat source below said threshold temperature may be unable to provide adequate (or any) heat to the one or more range extender engine components. In yet another example, the rate of heat transfer out of one or more waste heat sources may be increased by increasing the rate of flow of the heat exchange fluid through heat exchangers associated with waste heat sources above the threshold temperature, where said flow may increase more as the difference between the waste heat source temperature and the temperature threshold increases. In another example, the flow of heat exchange fluid through one or more waste heat source associated heat exchangers may increase based on an inferred rate of heat generation at said waste heat sources, with the flow increasing as the rate of heat generation increases. In a final example, the rate of heat extraction from the plurality of waste heat sources may be adjusted based on the total amount of waste heat to be transferred to range extender engine components, such the rate of transfer is adjusted to ensure the target temperatures of the range extender engine components are met prior to engine start. Method 600 may then proceed to 616.

At 616, method 600 includes utilizing heat stored in PCM, or bypassing, based on temperatures of PCM, waste heat sources, and range extender engine components (FIG. 7). Method 600 may then proceed to 618.

At 618, method 600 includes adjusting the rate of heat transfer into the plurality of range extender engine components based on the calculated allotment of available waste heat. In one example, adjusting the rate of heat transfer into one or more of the plurality of range extender engine components includes increasing the rate of heat transfer into said component as the allotted portion of the total available waste heat to be transferred into said component(s) increases. In another example, the adjusting includes decreasing the rate of heat transfer into one or more range extender engine components as the allotted portion of the total available waste heat to be transferred into said component(s) is decreased. In another example, when heat transfer is achieved via operation of a fluidically coupled network of heat exchangers, such as in heat exchange system 160, adjusting the rate of heat transfer into the plurality of range extender engine components may include adjusting a position of a valve, or valves, associated with heat exchangers in thermal contact with said range extender engine components, and thereby adjusting the flow of a heat exchange fluid therethrough. In this way, the target amount of heat to be transferred to each range extender engine component is achieved, as determined according to the allotment calculated at 610 above. Method 600 may then proceed to 620.

At 620, method 600 includes evaluating if preheating of one or more, or all, range extender engine components is completed. In one example, evaluating if a range extender engine component is preheated may include determining if the current temperature of said range extender engine component is greater than its corresponding target temperature, where the target temperature may be determined based upon the waste heat allotted to said component according to the allotment calculation discussed in more detail above, at 610. In another example, inferring the current temperature of the range extender engine component(s) being evaluated may be achieved as discussed above at 608. In another example, the range extender engine components may be compared to their target temperatures on an individual basis, thereby enabling preheating to be terminated to those range extender engine components which require no further heating, while maintaining preheating of those components which are in need of further preheating. If at 620 a determination is made that preheating is not completed, preheating may continue, as at 622, until such time as the determination is made that preheating is completed. Method 600 may then proceed to 624.

At 624, method 600 includes ceasing heat transfer. In one example, ceasing heat transfer between waste heat sources and range extender engine components may be achieved by ceasing operation of a heat exchange system. In another example, ceasing operation of said heat exchange system may include shutting off one or more, or all, pumps associated with the heat exchange system. In another example, ceasing heat transfer to one or more, or all, range extender engine components may include closing one or more valves associated with said components, thereby preventing flow of a heat exchange fluid through the heat exchanger(s) associated with said components. In a further example, heat transfer between a subset of the plurality of waste heat sources and range extender engine components may be terminated, and in that way the rate of heat transfer between the still operating waste heat sources and range extender engine components may be increased. Although not explicitly depicted in FIG. 6, it will be appreciated that if the heat exchange fluid temperature exceeds an upper temperature threshold for one or more of the waste heat sources, or range extender engine components, heat exchange fluid flow to the one or more waste heat sources or range extender engine components may be disabled by the vehicle controller, such as by actuating a valve, thereby preventing overheating. Said upper temperature threshold may be determined for one or more, or each, of the plurality of heat exchanger associated waste heat sources, and range extender engine components, based on the performance of said waste hear source or range extender engine component as a function of temperature, or further based on the material properties of the waste heat source or range extender engine component. In one example, the upper threshold temperature of electronic vehicle components may be 200 degrees Fahrenheit. Method 600 may then end.

In this way, a controller of a series type hybrid electric vehicle employing a method, such as method 600, may preheat one or more of a plurality of range extender engine components based on a calculated allotment of the waste heat available at a plurality of waste heat sources, such that a maximum increase in one or more, or a weighted combination, of performance metrics of range extender engine operation may be achieved upon engine start. This may further enable a reduction in a duration of sub-optimal engine performance following range extender engine start, such as when the engine starts from ambient temperature. The preheating of method 600 may be carried out by operation of a heat exchange system, such as heat exchange system 160, which in some embodiments contains a heat reservoir (such as a PCM based heat reservoir). Under some conditions the PCM based heat reservoir may store heat for later utilization, such as when excess heat is available. Under other conditions the PCM based heat reservoir may be used to supplement, or substitute for, the waste heat available the plurality of waste heat sources. Operation of the heat reservoir may be regulated by a controller of the vehicle, such as controller 190, implementing one or more methods stored in memory, such as method 700 of FIG. 7.

Turning now to FIG. 7 an example method 700 is shown. Method 700 is for implementation by a controller of a vehicle possessing a heat exchange system, and further possessing a heat reservoir (such as a PCM based heat reservoir) thermally coupled to said heat exchange system. Method 700 expands the utility of preheating methods, such as method 600, by offering a strategy to store waste heat when excess waste heat is available, and to utilize the stored waste heat when other sources of waste heat are inadequate to achieve preheating, or when a higher rate of preheating is desired. This enables preheating methods, such as method 600, to be usefully employed over a larger range of vehicle use scenarios, such as when a range extender engine needs to be started early in a drive cycle (and thus requires preheating), and other sources of waste heat are not yet at high enough temperatures to provide adequate preheating. Method 700 may be included entirely, or in part, in a method for preheating range extender engine components, the scheduling of said preheating based on a required duration of preheating, and further based on a predicted engine start time, such as at 318 of method 300. Method 700 may also be included in a method for operating a heat exchange system to provide an allotted portion of available waste heat to one or more of a plurality of range extender engine components, such as method at 616 of method 600.

Method 700 begins at 702 and includes estimating and/or measuring vehicle operating conditions. Vehicle operating conditions may include one or more of vehicle speed, vehicle location, duration of vehicle operation during current drive cycle, etc., various motor conditions, such as motor status (on or off), motor temperature, motor torque, motor speed, etc., various engine conditions, such as engine status (on or off), engine speed, engine temperature, time since previous engine shutdown, time since previous engine start, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc., various battery conditions, such as a current battery state of charge, current battery temperature, etc. Method 700 may then proceed to 704.

At 704, method 700 includes measuring or inferring ambient conditions. Ambient conditions may include the temperature of the ambient air, the prevailing barometric pressure, the humidity, wind and weather conditions, etc. Ambient conditions may be measured or inferred by the vehicle controller based on output from one or more vehicle sensors. In one example, the air temperature may be estimated based on output from one or more vehicle temperature sensors. In another example, the barometric pressure may be measured or inferred based on output from one or more vehicle pressure sensors, such as an intake manifold pressure sensor. In yet another example, ambient conditions may be obtained via connection to a wireless network, which may include access to a navigation/weather system. Method 700 may then proceed to 706.

At 706, method 700 includes estimating and/or measuring the temperatures of the PCM heat reservoir, waste heat sources, and range extender engine components. This may be done as given by examples at 606, and 608 of method 600. The temperature of the PCM heat reservoir may be measured or inferred in any manner conventional in the art. In one example, the temperature of the PCM heat reservoir may be inferred based on an output of one or more temperature sensors, such as temperature sensor 284 in heat exchange system 160. In another example, the temperature of the PCM based heat reservoir may be based on a "book-keeping" method, where the total heat input and output are summed to give a current temperature of the PCM heat reservoir. Said heat inputs and outputs may be based on ambient conditions, and may further be based on operation of a heat exchanger associated with the PCM heat reservoir, such as PCM HEX 224 of heat exchange system 160. Once the temperatures of the waste heat sources, range extender engine components, and PCM heat reservoir are estimated method 700 may then proceed to 708.

At 708, method 700 includes evaluating if the PCM based heat reservoir is at greater than a threshold temperature. In one example, the threshold temperature may be based on the temperatures of the range extender engine components to be preheated, such that the threshold temperature is higher than the lowest temperature range extender engine component to be preheated. A PCM heat reservoir at greater than the threshold temperature may be able to provide preheating to one or more of the plurality of range extender engine components. If at 708 the controller determines that the PCM based heat reservoir possesses a temperature greater than the threshold temperature, method 700 may proceed to 710.

At 710, method 700 includes evaluating if one or more of the range extender engine components requires preheating. In one example, evaluating if one or more of the range extender engine components requires preheating includes determining if a range extender engine is predicted to start, and further includes determining if one or more range extender engine components is below a threshold temperature. Said threshold temperature may be based on the optimum operating temperature of the range extender engine component, such that an increase in temperature may confer a performance benefit of said component. If at 710, the controller determines that no range extender engine components require preheating, method 700 may then proceed to 714. At 714, method 700 may include retaining stored waste heat in the PCM based heat reservoir, as no preheating is required at this time. In an example, retaining stored waste heat in the PCM heat reservoir may include, preventing flow through a heat exchanger associated with said PCM heat reservoir. In another example, preventing flow through a heat exchanger associated with the PCM heat reservoir may include moving a valve to, or maintaining a valve in, a closed position, where the valve may control flow of a heat exchange fluid through said heat exchanger, such as valve 252 of heat exchange system 160. Method 700 may then end.

Returning to 710, if the controller determines that one or more range extender engine components requires preheating, as explained in more detail above, method 700 may then proceed to 716. At 716, method 700 includes utilizing waste heat stored in the PCM based heat reservoir to preheat range extender engine components. In one example, waste heat stored in the PCM heat reservoir may be utilized by flowing a heat exchange fluid through a heat exchanger associated with said PCM heat reservoir. As the heat exchange fluid flows through the PCM heat reservoir associated heat exchanger, heat may be transferred from the PCM heat reservoir to the heat exchange fluid. The heat exchange fluid may then flow through one or more heat exchangers associated with range extender engine components requiring preheating, based on the portion of total available waste heat to be transferred to said components, as described in more detail in method 600. In a further example, the flow of heat exchange fluid through the heat exchanger associated with the PCM heat reservoir may be controlled by position of a valve, the rate of extraction of waste heat from said PCM heat reservoir may be controlled by the position of this valve, such that a greater opening of the valve may result in a greater rate of heat transfer, and a lesser opening of the valve may result in a lesser rate of heat transfer. In another example, utilizing the waste heat stored in the PCM heat reservoir may occur simultaneously with extraction of heat from one or more of the plurality of waste heat sources, or it may occur. Method 700 may then end.

Returning to 708, if the controller determines that the PCM based heat reservoir is at a lower temperature than the threshold temperature, method 700 may proceed to 712. At 712, method 700 may include evaluating if one or more of the range extender engine components requires preheating, such as discussed above in regards to 710. If at 712, the controller determines that preheating is required, method 700 may then proceed to 718. At 718, method 700 includes conducting preheating without utilizing PCM. As at 718 it has been determined that the PCM heat reservoir is below a temperature threshold, indicating little or no capacity for preheating, and further it has been determined that preheating of one or more range extender engine components is required, preheating may be provided via waste heat sources other than the PCM based heat reservoir. In one example, preheating is conducting via waste heat sources other than the PCM based heat reservoir, according to a method of a vehicle controller, such as method 600. During said preheating via other waste heat sources, a heat exchanger associated with the PCM heat reservoir may be fluidically isolated from the other waste heat source associated heat exchangers. In another example, fluidically isolating a heat exchanger associated with the PCM heat reservoir may include moving a valve to, or maintaining a valve in, a closed position, where the valve may control flow of a heat exchange fluid through said heat exchanger, such as valve 252 of heat exchange system 160. Method 700 may then end.

Returning to 712, if the controller determines that no range extender engine component preheating is required, method 700 may then proceed to 720. At 720, method 700 includes storing any available waste heat in the PCM heat reservoir for later use. As no preheating of range extender engine components is required at 720, waste heat available at the plurality of waste heat sources may be utilized to increase the temperature of the PCM housed within the PCM heat reservoir, thereby enabling this heat to be accessed for various purposes at a later time. In one example, waste heat is stored in the PCM heat reservoir by transferring heat from one or more of a plurality of waste heat sources, to the PCM heat reservoir, via operation of a heat exchange system. Operation of the heat exchange system may include flowing heat exchange fluid through a heat exchanger associated with the one or more waste heat sources, followed by following said heat exchange fluid through a heat exchanger associated with the PCM heat reservoir. Flow through one or more of the above mentioned heat exchangers may be controlled by a vehicle controller, such as controller 190, via actuation of one or more valves associated with said heat exchangers, or by controlling the output of one or more pumps providing generating said flow. Actuation of said valves may control a cross section of flow in a pipe or conduit leading to said heat exchanger(s), and by changing the cross section of flow, the flowrate of a heat exchange fluid through said heat exchanger(s) may be controlled, or terminated. Method 700 may then end.

In this way, by employing method 700, a vehicle controller may expand the range of scenarios in which range extender engine components may be preheated using waste heat, such as by method 600, thereby conferring a performance benefit to a range extender engine upon start-up, and reducing a duration of sub-optimal engine performance subsequent to said start-up.

In this way, by utilizing the waste heat available at a plurality of waste heat sources present in a vehicle operating via electric motor propulsion, to preheat one or more of the plurality of temperature sensitive range extender engine components, using a heat exchange system, and based on the predicted performance benefit achieved in the plurality of range extender engine components as a function of said preheating, the performance of a range extender engine can be increased upon start up, relative to a range extender engine starting from ambient temperatures. Further, by estimating the duration required to achieve this preheating by operation of a heat exchange system, based on the temperatures and waste heat available at the waste heat sources, and further based on the extent of preheating required for the plurality of range extender engine components, a more accurate estimation of the time required to achieve said preheating can be made. This more accurate estimate of the duration of preheating can be used in conjunction with a predicted start time of the range extender engine, to schedule said preheating such that preheating is achieved within a threshold time of, and prior to, the predicted start, and in this way a duration of sub-optimal engine operation following cold start can be reduced. Further, by predicting the range extender engine start based on a current battery SOC, an estimated running average rate of power consumption, a current route to a destination, time/distance remaining to reach destination, current route conditions, and operator driving history, the accuracy of said predicted start can be improved, and such that the range extender engine start can be predicted far enough in advance to enable said preheating to be conducted before the predicted engine start, thus enabling the above stated advantages.

One example method for a vehicle comprises transferring, via a heat exchange mechanism, waste heat from a vehicle drive motor and associated power electronics to pre-heat an internal combustion engine. In the preceding example, additionally or optionally, transferring waste heat from the vehicle drive motor and the associated power electronics includes transferring waste heat from a traction motor, a battery, an inverter, and an alternator, the method further comprising transferring waste heat from one or more additional waste heat sources including a transmission, a vehicle air conditioning system, and a vehicle cabin. In any or all of the preceding examples, additionally or optionally, the transferring occurs while propelling the vehicle via the vehicle drive motor, the method further comprising, adjusting a starting of the transferring based on a predicted start of the engine, the starting adjusted to complete pre-heating of the engine before the predicted start. In any or all of the preceding examples, additionally or optionally, the starting is further adjusted based on a magnitude of the waste heat, the transferring started earlier relative to the predicted start of the engine as the magnitude of waste heat decreases. In any or all of the preceding examples, additionally or optionally, the method further comprises estimating the magnitude of the waste heat based on each of a duration of operation of the motor, average motor output, and ambient temperature. In any or all of the preceding examples, additionally or optionally, the predicted start of the engine is predicted based on an occurrence of peak torque exceeding an electrical torque capacity of the motor during a current drive cycle. In any or all of the preceding examples, additionally or optionally, the electrical torque capacity of the motor during the current drive cycle is estimated based on a state of charge of a battery coupled to the motor, and wherein the peak torque is estimated based on a plurality of parameters associated with a route of travel on the current drive cycle, the plurality of parameters including a road grade, weather and traffic conditions along the routine of travel, average vehicle speed, and driver history. In any or all of the preceding examples, additionally or optionally, the engine is a range extender engine indirectly coupled to wheels of the vehicle via a battery of the vehicle drive motor. In any or all of the preceding examples, additionally or optionally, the heat exchange mechanism includes a plurality of heat exchangers correspondingly coupled to each of the vehicle drive motor, the associated power electronics, and the engine, the heat exchange mechanism further including one or more of a circulating coolant and a phase change material.

Another example method comprises: while propelling a hybrid vehicle via an electric motor on a drive cycle, transferring, via a heat exchange mechanism, waste heat generated on-board the vehicle to pre-heat an engine before the engine is started on the drive cycle. In the preceding example, additionally or optionally, the engine is started responsive to a state of charge of a battery coupled to the electric motor falling below a threshold, and wherein the engine is coupled to wheels of the vehicle via the battery. In any or all of the preceding examples, additionally or optionally, the waste heat includes waste heat generated by the electric motor, associated power electronics including an inverter, a battery, and an alternator, a vehicle air conditioning system, and a cabin console. In any or all of the preceding examples, additionally or optionally, the method further comprises adjusting a starting of the transferring based on the waste heat generated on-board the vehicle relative to an amount of heat required to pre-heat the engine to a target temperature at engine start. In any or all of the preceding examples, additionally or optionally, the method further comprises predicting the engine start based on an occurrence of peak torque demand exceeding electrical torque output of the motor on the drive cycle, the occurrence of peak torque demand predicted based on parameters associated with a route of travel on the drive cycle, the electrical torque output of the motor estimated based on the battery state of charge. In any or all of the preceding examples, additionally or optionally, transferring the waste heat via the heat exchange mechanism includes transferring via one or more of circulating coolant and a phase change material. In any or all of the preceding examples, additionally or optionally, the heat exchange mechanism includes a first heat exchanger coupled to the electric motor, a second heat exchanger coupled to the engine, each of the first and second heat exchanger circulating the coolant, and a third heat exchanger coupled to each of the first and second heat exchanger, the third heat exchanger additionally coupled to a phase change material reservoir. In any or all of the preceding examples, additionally or optionally, waste heat from motor operation is transferred from the motor to the phase change material via the first and the third heat exchangers when a temperature of the phase change material is below a threshold, and wherein the waste heat is transferred from the phase change material to the engine via the second and the third heat exchangers when the temperature of the phase change material is above the threshold.

In another example, a system for a hybrid vehicle comprises: an electric motor, powered via a battery; an engine coupled to the battery; a heat exchange system including a valve; and a controller with computer readable instructions stored on non-transitory memory for propelling the vehicle via the electric motor; adjusting a position of the valve to transfer waste heat from the electric motor to pre-heat the engine; and starting the engine, after the pre-heating, responsive to a state of charge of the battery falling below a threshold. In any or all of the preceding examples, additionally or optionally, the controller includes further instructions for predicting the starting of the engine based on average motor output, rate of change of battery state of charge, and route of travel parameters; and beginning the transferring of waste heat to pre-heat the engine to a target temperature before the engine start. In any or all of the preceding examples, additionally or optionally, the controller includes further instructions for estimating a magnitude of the waste heat based on each of a duration of operation of the motor, the average motor output, and ambient temperature, wherein the beginning of the transferring is adjusted based on the magnitude of the waste heat.

Another example method for an electric vehicle comprises: operating in a first mode with waste heat from a vehicle drive motor and associated power electronics transferred, via a heat exchange mechanism, to pre-heat only a first engine component prior to an engine start; and operating in a second mode with the waste heat transferred to pre-heat only a second, different engine component prior to the engine start. In the preceding example, additionally or optionally, the method further comprises selecting the first mode responsive to a first performance benefit associated with operating the engine with the first engine component pre-heated exceeding a second performance benefit associated with operating the engine with the second engine component pre-heated, and selecting the second mode responsive to the second performance benefit exceeding the first performance benefit. In any or all of the preceding examples, additionally or optionally, the first performance benefit includes one of a first engine fuel efficiency increase, a first reduction in engine wear, and a first reduction in exhaust emissions upon transferring of the waste heat to the first engine component, and wherein the second performance benefit includes a second engine fuel efficiency increase, a second reduction in engine wear, and a second reduction in emissions upon transferring the waste heat to the second engine component. In any or all of the preceding examples, additionally or optionally, the method further comprises operating in a third mode with a first portion of the waste heat transferred to the first engine component and a second, remaining portion of the waste heat transferred to the second engine component, a ratio of the first portion relative to the second portion adjusted based on a temperature of the first engine component relative to a temperature of the second engine component. In any or all of the preceding examples, additionally or optionally, the first portion is increased relative to the second portion as the temperature of the first component falls below the temperature of the second component. In any or all of the preceding examples, additionally or optionally, the ratio is further adjusted based on the first performance benefit relative to the second performance benefit, the first portion increased relative to the second portion as the first performance benefit exceeds the second estimated performance benefit. In any or all of the preceding examples, additionally or optionally, the method further comprises estimating a magnitude of the waste heat based on a duration of motor operation and average motor output on a current drive cycle; and selecting between the first, second, and third mode based on a magnitude of the waste heat, the third mode selected responsive to the magnitude being higher than a threshold, one of the first and second mode selected responsive to the magnitude being lower than the threshold. In any or all of the preceding examples, additionally or optionally, the first engine component includes an exhaust gas oxygen sensor and the second engine component includes an exhaust gas catalytic converter. In any or all of the preceding examples, additionally or optionally, transferring waste heat from the vehicle drive motor and associated power electronics includes transferring waste heat from the motor, a battery, an inverter, and an alternator. In any or all of the preceding examples, additionally or optionally, the engine is coupled to vehicle wheels indirectly via the battery, and wherein the engine is started to provide electrical energy to the battery. In any or all of the preceding examples, additionally or optionally, the method further comprises, during each of the first, second, and third mode, predicting the engine start based on a driver demanded motor torque exceeding a maximum achievable motor torque during the current drive cycle. In any or all of the preceding examples, additionally or optionally, the method further comprises predicting the driver demanded motor torque exceeding the maximum achievable torque based on a vehicle location, a present route to a destination during the current drive cycle, a driver history, a running average battery power depletion rate along the present route to the destination on the current drive cycle, a current battery state of charge, and route conditions.

Another example method comprises, while propelling a vehicle via an electric motor, starting an engine to charge a battery coupled to the motor; during a first engine start, transferring all waste heat generated at the motor and associated power electronics to a first engine component before starting the engine; during a second condition, transferring all the waste heat to a second engine component before starting the engine; and during a third condition, distributing the waste heat between the first engine component and the second engine component before starting the engine. In any or all of the preceding examples, additionally or optionally, the first engine component is a combustion chamber, and the second engine component is one of an exhaust catalyst and an exhaust gas oxygen sensor. In any or all of the preceding examples, additionally or optionally, during the first condition, a first fuel economy benefit of operating the engine with the first component preheated and the second component not preheated is higher than a second fuel economy benefit of operating the engine with the second component preheated and the first component not preheated; wherein during the second condition, the first fuel economy benefit is lower than the second fuel economy benefit, and wherein during the third condition, a third fuel economy benefit of operating the engine with each of the first and second component preheated is higher than each of the first and second fuel economy benefit. In any or all of the preceding examples, additionally or optionally, the method further comprises modeling each of the first, second, and third fuel economy benefit using component temperature as an input.

Another example vehicle system comprises an electric motor coupled to vehicle wheels; a battery coupled to the electric motor and an alternator; an engine coupled to the battery via the alternator, the engine including an exhaust catalyst and a cylinder; a heat exchange system including a plurality of heat exchangers, a circulating coolant, and a phase change material; and a controller with instructions stored in non-transitory memory for: while propelling vehicle wheels via the motor on a drive cycle, transferring heat via the heat exchange system from the motor, the alternator, and the battery to pre-heat one or more of the cylinder and the exhaust catalyst to a target temperature before engine start; and after the pre-heating, starting the engine to raise the state of charge of the battery above a threshold charge. In the preceding examples, additionally or optionally, the controller includes further instructions for transferring heat to pre-heat only the cylinder responsive to a first difference between actual cylinder temperature and target cylinder temperature being higher than a second difference between actual catalyst temperature and target catalyst temperature; and transferring heat to pre-heat only the catalyst responsive to the first difference being lower than the second difference. In any or all of the preceding examples, additionally or optionally, the controller includes further instructions for: predicting a timing of the engine start based on an occurrence of peak torque demand exceeding electrical torque output of the motor on the drive cycle, the occurrence of peak torque demand predicted based on parameters associated with a route of travel on the drive cycle, the electrical torque output of the motor estimated based on the battery state of charge; and adjusting a starting of the transferring of waste heat to complete the preheating before the predicted timing of the engine start. In any or all of the preceding examples, additionally or optionally, the controller includes further instructions for: adjusting a valve of the heat exchanger system to transfer the waste heat from a heat exchanger associated with the motor to the circulating coolant and the phase change material and then from the circulating coolant and the phase change material to one or more of the cylinder and the exhaust catalyst.

Yet another method comprises: while propelling a vehicle via an electric drive motor on a drive cycle, adjusting an order of transferring waste heat from the motor and associated power electronics to a plurality of engine components, before an engine start, based at least on engine component temperature. In the preceding example, additionally or optionally, the waste heat includes waste heat generated via the motor, via a battery powering the motor, and via each of an inverter and an alternator coupled to the motor and/or the battery. In any or all of the preceding examples, additionally or optionally, adjusting the order of transferring waste heat to the plurality of engine components includes adjusting the order of transferring the waste heat to each of an engine cylinder, an exhaust catalyst, and an exhaust oxygen sensor. In any or all of the preceding examples, additionally or optionally, adjusting the order includes estimating a difference between a current temperature of each of the plurality of engine components and a corresponding target temperature at engine start, and transferring heat initially to one of the plurality of engine components having a largest difference. In any or all of the preceding examples, additionally or optionally, adjusting the order includes estimating a difference between a current temperature of each of the plurality of engine components and a corresponding target temperature at engine start, and transferring heat initially to one of the plurality of engine components having a smallest difference. In any or all of the preceding examples, additionally or optionally, the engine start is predicted based on an occurrence of peak torque demand exceeding maximum torque output of the motor, the peak torque demand predicted based on parameters associated with a route of travel on the drive cycle, the maximum torque output of the motor predicted based on a rate of change in battery state of charge. In any or all of the preceding examples, additionally or optionally, the method further comprises estimating the waste heat available on the drive cycle based on the parameters associated with the route of travel including traffic and weather conditions of the route, road grade, and operator driving history, the parameters retrieved from a navigation system of the vehicle. In any or all of the preceding examples, additionally or optionally, the adjusting order is further based on a location of each of the plurality of engine components relative a source of the waste heat. In any or all of the preceding examples, additionally or optionally, the adjusting includes transferring waste heat from the motor and associated power electronics initially to one of the plurality of engine components located closest to the motor, and lastly to another of the plurality of engine components located further from the motor. In any or all of the preceding examples, additionally or optionally, adjusting the order is further based on a performance benefit associated with each of the plurality of engine components, the adjusting includes transferring the waste heat initially to a first of the plurality of the engine components having a highest performance benefit when operated pre-heated. In any or all of the preceding examples, additionally or optionally, the waste heat is transferred from the motor and associated power electronics to the plurality of engine components via a heat exchange system including a heat exchange valve, circulating coolant, and a phase change material.

Still another example method comprises, while propelling a vehicle via an electric motor, predicting an engine start time based on change in state of charge of a battery coupled to the motor; during a first mode, prior to engine start, transferring waste heat from the motor and associated power electronics to initially pre-heat a first engine component and then pre-heat a second engine component; and during a second mode, prior to the engine start, transferring the waste heat from the motor and associated power electronics to initially pre-heat the second engine component and then pre-heat the first engine component. In the preceding example, additionally or optionally, pre-heating the first engine component includes pre-heating to a first target temperature at the engine start, and wherein pre-heating the second engine component includes pre-heating to a second, different target temperature at the engine start. In any or all of the preceding examples, additionally or optionally, the method further comprises selecting between the first mode and the second mode based on a magnitude of the waste heat, and further based on a current temperature of each of the first and the second engine component. In any or all of the preceding examples, additionally or optionally, the selecting includes: selecting the first mode when the magnitude of the waste heat is sufficient to pre-heat the first engine component from the current temperature to the first target temperature but not sufficient to pre-heat the second engine component from the current temperature to the second target temperature; and selecting the second mode when the magnitude of the waste heat is sufficient to pre-heat the second engine component from the current temperature to the second target temperature but not sufficient to pre-heat the first engine component from the current temperature to the first target temperature. In any or all of the preceding examples, additionally or optionally, the method further comprises during the first mode, heating the second engine component to the second target temperature using engine heat after the engine start, and during the second mode, heating the first engine component to the first target temperature using engine heat after the engine start. In any or all of the preceding examples, additionally or optionally, the selecting is further based on a first fuel economy benefit of operating the engine with the first engine component pre-heated relative to a second fuel economy benefit of operating the engine with the second engine component pre-heated, the first mode selected when the first fuel economy benefit exceeds the second fuel economy benefit, the second mode selected when the second fuel economy benefit exceeds the first fuel economy benefit.

Another example vehicle system comprises: an electric motor coupled to vehicle wheels; a battery coupled to the electric motor and an alternator; an engine coupled to the battery via the alternator; a heat exchange system thermally coupled to the motor and the engine; and a controller with instructions stored in non-transitory memory for: while propelling a vehicle via the electric motor, predicting an engine start time based on an occurrence of peak torque demand exceeding maximum electrical torque output; and prior to the predicted engine start time, transferring waste heat from the electric motor, the battery, and the alternator to pre-heat a plurality of components of the engine, an order of transferring heat to the plurality of engine components selected based on a magnitude of the waste heat and a temperature of the plurality of the engine components. In the preceding example, additionally or optionally, the order of transferring heat is adjusted to pre-heat each of the plurality of engine components to a corresponding target temperature before the predicted engine start time. In any or all of the preceding examples, additionally or optionally, the controller includes further instructions for: selecting a first engine component for pre-heating having a current temperature closer to the corresponding target temperature; and then selecting a second engine component for pre-heating the current temperature further from the corresponding target temperature.

Yet another example method comprises: while propelling a vehicle via an electric motor, adjusting a starting of pre-heating an engine based on an occurrence of peak torque demand exceeding electric torque capacity of the motor in a drive cycle. In the preceding example, additionally or optionally, the method further comprises predicting the occurrence of peak torque demand in the drive cycle based on each of driver history, route of travel, and route conditions including weather and traffic conditions, wherein the driver history includes average vehicle speed and frequency of acceleration and deceleration indexed as a function of the route of travel, and wherein the route conditions are retrieved from a navigation system communicatively coupled to the vehicle. In any or all of the preceding examples, additionally or optionally, the method further comprises predicting the electric torque capacity of the motor based on a state of charge of a battery powering the electric motor. In any or all of the preceding examples, additionally or optionally, the predicting based on the state of charge of a battery includes predicting based on an initial state of charge of the battery at an onset of the drive cycle, and further based on a rate of change in the state of charge during the drive cycle. In any or all of the preceding examples, additionally or optionally, the method further comprises starting the engine responsive to the occurrence of the peak torque demand exceeding the electric torque capacity of the motor to charge the battery. In any or all of the preceding examples, additionally or optionally, the adjusting includes starting the pre-heating of the engine to raise engine component temperature to a target temperature before the engine is started. In any or all of the preceding examples, additionally or optionally, pre-heating the engine includes transferring waste heat from the electric motor and associated power electronics to the engine via a heat exchange mechanism. In any or all of the preceding examples, additionally or optionally, the adjusting is further based on a magnitude of the waste heat, the pre-heating started before the engine start and earlier in the drive cycle as the magnitude of the waste heat increases. In any or all of the preceding examples, additionally or optionally, the method further comprises adjusting an order of transferring waste heat to a plurality of components of the engine based on engine component temperature relative to a corresponding target temperature. In any or all of the preceding examples, additionally or optionally, the plurality of components of the engine include a combustion chamber, an exhaust catalyst, and an exhaust gas oxygen sensor. In any or all of the preceding examples, additionally or optionally, adjusting the order includes initially transferring the waste heat to a first of the plurality of engine components having the engine component temperature closest to the corresponding target temperature, and then transferring the waste heat to a second of the plurality of the engine components having the engine component temperature further from the corresponding target temperature.

Another example method comprises: while propelling a vehicle via an electric motor along a route, transferring waste heat generated at the motor and associated power electronics to pre-heat the engine before an engine start, a timing of the pre-heating adjusted based on an occurrence of peak torque demand exceeding electric torque capacity of the motor in a drive cycle. In the preceding example, additionally or optionally, the method further comprises predicting a battery state of charge profile over the drive cycle based on a current rate of change of battery state of charge and parameters associated with a route of travel; predicting a torque demand profile over the route based on the route parameters and driver history; and predicting the occurrence of peak torque demand exceeding electric torque capacity of the motor in the drive cycle based on the battery state of charge profile relative to the torque demand profile. In any or all of the preceding examples, additionally or optionally, the occurrence is predicted to be earlier in the drive cycle responsive to a higher road grade or higher average vehicle speed, and wherein the occurrence is predicted to be later in the drive cycle responsive to a lower road grade or lower average vehicle speed. In any or all of the preceding examples, additionally or optionally, the transferring includes transferring the waste heat from the electric motor, a battery powering the motor, an inverter, and an alternator to the engine via a heat exchange system including circulating coolant and a phase change material. In any or all of the preceding examples, additionally or optionally, the transferring further includes: transferring the waste heat to a first engine component and then a second engine component responsive to a first fuel economy benefit of operating the engine with the first component hotter than the second component is higher than a second fuel economy benefit of operating the engine with the second component hotter than the first component; and transferring the waste heat to the second engine component and then the first engine component responsive to the second fuel economy benefit being higher than the first fuel economy benefit.

Yet another example vehicle system comprises: an electric motor; a battery coupled to the electric motor; an engine coupled to the battery via an alternator; a heat exchange system; and a controller with computer readable instructions stored in non-transitory memory for: while propelling the vehicle via the motor, transferring waste heat from the motor, battery, and alternator to the engine via the heat exchange system before starting the engine responsive to an occurrence of peak torque demand exceeding electric torque capacity of the motor in a drive cycle. In the preceding example, additionally or optionally, the controller includes further instructions for adjusting a beginning of the transferring of waste heat to pre-heat one or more engine components to a corresponding target temperature before starting the engine. In any or all of the preceding examples, additionally or optionally, the controller includes further instructions for adjusting an order of transferring the waste heat to the one or more engine components based on a temperature of each of the one or more engine components relative to the corresponding target temperature. In any or all of the preceding examples, additionally or optionally, the heat exchange system includes a phase change material, and wherein the transferring of the waste heat includes transferring the waste heat from the motor, battery, and alternator to the phase change material while a temperature of the phase change material is below a threshold, and transferring the waste heat from the phase change material to the engine when the temperature of the phase change material is above the threshold.

Further, another example method comprises: while propelling a vehicle via an electric motor along a route, adjusting a starting of pre-heating an engine based on an occurrence of torque demand to reach destination of the route exceeding electric torque capacity of the motor in a drive cycle. In the preceding example, additionally or optionally, the method further comprises predicting the torque demand to reach the destination based on each of driver history, route of travel, and route conditions including weather and traffic conditions, wherein the driver history includes average vehicle speed and frequency of acceleration and deceleration indexed as a function of the route of travel, and wherein the route conditions are retrieved from a navigation system communicatively coupled to the vehicle. In any or all of the preceding examples, additionally or optionally, the method further comprises predicting the electric torque capacity of the motor based on a state of charge of a battery powering the electric motor. In any or all of the preceding examples, additionally or optionally, predicting based on the state of charge of a battery includes predicting based on an initial state of charge of the battery at an onset of the drive cycle, and further based on a rate of change in the state of charge during the drive cycle. In any or all of the preceding examples, additionally or optionally, the method further comprises starting the engine responsive to the occurrence of the peak torque demand exceeding the electric torque capacity of the motor to charge the battery. In any or all of the preceding examples, additionally or optionally, the adjusting includes starting the pre-heating of the engine to raise engine component temperature to a target temperature before the engine is started. In any or all of the preceding examples, additionally or optionally, pre-heating the engine includes transferring waste heat from the electric motor and associated power electronics to the engine via a heat exchange mechanism. In any or all of the preceding examples, additionally or optionally, the adjusting is further based on a magnitude of the waste heat, the pre-heating started before the engine start and earlier in the drive cycle as the magnitude of the waste heat increases. In any or all of the preceding examples, additionally or optionally, the method further comprises adjusting an order of transferring waste heat to a plurality of components of the engine based on engine component temperature relative to a corresponding target temperature. In any or all of the preceding examples, additionally or optionally, the plurality of components of the engine include a combustion chamber, an exhaust catalyst, and an exhaust gas oxygen sensor. In any or all of the preceding examples, additionally or optionally, adjusting the order includes initially transferring the waste heat to a first of the plurality of engine components having the engine component temperature closest to the corresponding target temperature, and then transferring the waste heat to a second of the plurality of the engine components having the engine component temperature further from the corresponding target temperature.

A further example method comprises: while propelling a vehicle via an electric motor along a route, transferring waste heat generated at the motor and associated power electronics to pre-heat the engine before an engine start, a timing of the pre-heating adjusted based on an occurrence of torque demand to reach destination of the route exceeding electric torque capacity of the motor in a drive cycle. In the preceding example, additionally or optionally, the method further comprises starting the engine based on the occurrence to raise a state of charge of a battery powering the motor, the state of charge raised to enable the electric torque capacity of the motor to meet the torque demand. In any or all of the preceding examples, additionally or optionally, the method further comprises predicting a battery state of charge profile over the drive cycle based on a current rate of change of battery state of charge and parameters associated with a route of travel; predicting a torque demand profile over the route based on the route parameters and driver history; and predicting the occurrence based on the battery state of charge profile relative to the torque demand profile. In any or all of the preceding examples, additionally or optionally, the transferring includes transferring the waste heat from the electric motor, a battery powering the motor, an inverter, and an alternator to the engine via a heat exchange system including circulating coolant and a phase change material. In any or all of the preceding examples, additionally or optionally, the transferring further includes: transferring the waste heat to a first engine component and then a second engine component responsive to a first fuel economy benefit of operating the engine with the first component hotter than the second component is higher than a second fuel economy benefit of operating the engine with the second component hotter than the first component; and transferring the waste heat to the second engine component and then the first engine component responsive to the second fuel economy benefit being higher than the first fuel economy benefit.

Still another vehicle system comprises: an electric motor; a battery coupled to the electric motor; an engine coupled to the battery via an alternator; a heat exchange system; and a controller with computer readable instructions stored in non-transitory memory for: while propelling the vehicle via the motor on a route, transferring waste heat from the motor, battery, and alternator to the engine via the heat exchange system before starting the engine responsive to an occurrence of torque demand to reach destination of the route exceeding electric torque capacity of the motor. In any or all of the preceding examples, additionally or optionally, the controller includes further instructions for adjusting a beginning of the transferring of waste heat to pre-heat one or more engine components to a corresponding target temperature before starting the engine; and adjusting an order of transferring the waste heat to the one or more engine components based on a temperature of each of the one or more engine components relative to the corresponding target temperature. In any or all of the preceding examples, additionally or optionally, the controller includes further instructions for adjusting an interval between the beginning of the transferring of waste heat and the starting the engine based on a state of charge of the battery relative to the torque demand to reach the destination of the route. In any or all of the preceding examples, additionally or optionally, the heat exchange system includes a phase change material, and wherein the transferring of the waste heat includes transferring the waste heat from the motor, battery, and alternator to the phase change material while a temperature of the phase change material is below a threshold, and transferring the waste heat from the phase change material to the engine when the temperature of the phase change material is above the threshold.

The invention claimed is:

1. A method for a vehicle, comprising:
while propelling the vehicle via a vehicle drive motor, transferring, via a heat exchange mechanism, waste heat from the vehicle drive motor and associated power electronics to pre-heat an internal combustion engine, and adjusting a starting timing of the transferring based on a predicted start of the engine, the starting adjusted to complete pre-heating of the engine before the predicted engine start.

2. The method of claim 1, wherein transferring waste heat from the vehicle drive motor and the associated power electronics includes transferring waste heat from a traction motor, and an inverter, the method further comprising transferring heat from an alternator and a battery to the engine, the method further comprising transferring waste heat from one or more additional waste heat sources including a transmission, a vehicle air conditioning system, and a vehicle cabin to the engine.

3. The method of claim 1, wherein the starting timing is further adjusted based on a magnitude of a predicted amount of available waste heat, the transferring started earlier relative to the predicted start of the engine as the magnitude of the predicted amount of available waste heat decreases.

4. The method of claim 3, further comprising estimating the magnitude of the predicted amount of available waste heat based on each of a duration of operation of the motor, average motor output, and ambient temperature.

5. The method of claim 1, wherein the predicted start of the engine is predicted based on an occurrence of peak torque exceeding an electrical torque capacity of the motor during a current drive cycle.

6. The method of claim 5, wherein the electrical torque capacity of the motor during the current drive cycle is estimated based on a state of charge of a battery coupled to the motor, and wherein the peak torque is estimated based on a plurality of parameters associated with a route of travel on the current drive cycle, the plurality of parameters including a road grade, weather and traffic conditions along the route of travel, average vehicle speed, and driver history.

7. The method of claim 1, wherein the engine is a range extender engine indirectly coupled to wheels of the vehicle via a battery of the vehicle drive motor.

8. The method of claim 1, wherein the heat exchange mechanism includes a plurality of heat exchangers correspondingly coupled to each of the vehicle drive motor, the associated power electronics, and the engine, the heat exchange mechanism further including one or more of a circulating coolant and a phase change material.

9. A method, comprising:
while propelling a hybrid vehicle via an electric motor on a drive cycle,
transferring, via a heat exchange mechanism, waste heat generated on-board the vehicle to pre-heat an engine before the engine is started on the drive cycle, and
adjusting a starting timing of the transferring based on an estimated amount of waste heat generated on-board the vehicle relative to an estimated amount of heat required to pre-heat the engine to a target temperature based on a predicted engine start time.

10. The method of claim 9, wherein the engine is started responsive to a state of charge of a battery coupled to the electric motor falling below a threshold, and wherein the engine is coupled to wheels of the vehicle via the battery to the battery via an alternator, and where the alternator is coupled to the electric motor, which in turn is coupled to wheels of the vehicle.

11. The method of claim 10, wherein the waste heat includes waste heat generated by the electric motor, associated power electronics including an inverter, the battery, the alternator, a vehicle air conditioning system, and a cabin console.

12. The method of claim 10, further comprising, predicting the engine start time based on an occurrence of peak torque demand exceeding electrical torque output of the motor on the drive cycle, the occurrence of peak torque demand predicted based on parameters associated with a route of travel on the drive cycle, the electrical torque output of the motor estimated based on the battery state of charge.

13. The method of claim 9, wherein transferring the waste heat via the heat exchange mechanism includes transferring via one or more of circulating coolant and a phase change material.

14. The method of claim 13, wherein the heat exchange mechanism includes a first heat exchanger coupled to the electric motor, a second heat exchanger coupled to the engine, each of the first and second heat exchanger circulating the coolant, and a third heat exchanger coupled to each of the first and second heat exchanger, the third heat exchanger additionally coupled to a phase change material reservoir.

15. The method of claim 14, wherein waste heat from motor operation is transferred from the motor to the phase change material via the first and the third heat exchangers when a temperature of the phase change material is below a threshold, and wherein the waste heat is transferred from the phase change material to the engine via the second and the third heat exchangers when the temperature of the phase change material is above the threshold.

16. A system for a hybrid vehicle, comprising:
an electric motor, powered via a battery;
an engine coupled to the battery;
a heat exchange system including a valve; and
a controller with computer readable instructions stored on non-transitory memory for:
propelling the vehicle via the electric motor; and
adjusting a position of the valve to transfer waste heat from the electric motor to pre-heat the engine; and
starting the engine, after the pre-heating, responsive to a state of charge of the battery falling below a threshold;
predicting the starting timing of the engine based on average motor output, rate of change of battery state of charge, and route of travel parameters; and
beginning the transferring of waste heat to pre-heat the engine to a target temperature before the engine start, a timing of the beginning based on the predicted starting time of the engine.

17. The system of claim 16, wherein the controller includes further instructions for:
estimating a magnitude of the waste heat based on each of a duration of operation of the motor, the average motor output, and ambient temperature, wherein the beginning timing of the transferring is adjusted based on the estimated magnitude of the waste heat.

* * * * *